(12) United States Patent
Lee et al.

(10) Patent No.: US 11,169,662 B2
(45) Date of Patent: *Nov. 9, 2021

(54) DISPLAY APPARATUS AND DISPLAY METHOD

(71) Applicant: SAMSUNG ELECTRONICS CO., LTD., Suwon-si (KR)

(72) Inventors: Jin-ha Lee, Seoul (KR); Heui-jin Kwon, Seongnam-si (KR); Young-sun Kim, Suwon-si (KR); Da-hye Shim, Seoul (KR); Tae-kwan Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

This patent is subject to a terminal disclaimer.

(21) Appl. No.: 16/176,119

(22) Filed: Oct. 31, 2018

(65) Prior Publication Data
US 2019/0065013 A1      Feb. 28, 2019

Related U.S. Application Data

(63) Continuation of application No. 14/986,963, filed on Jan. 4, 2016, now Pat. No. 10,152,205.

(30) Foreign Application Priority Data

Jan. 5, 2015   (KR) .................. 10-2015-0000868

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04842* (2013.01); *H04N 21/4312* (2013.01); *H04N 21/482* (2013.01)

(58) Field of Classification Search
None
See application file for complete search history.

(56) References Cited

U.S. PATENT DOCUMENTS

| 5,677,708 A | 10/1997 | Matthews, III et al. |
| 5,956,035 A | 9/1999 | Sciammarella et al. |

(Continued)

FOREIGN PATENT DOCUMENTS

| CN | 1866995 A | 11/2006 |
| CN | 101866995 A | 10/2010 |

(Continued)

OTHER PUBLICATIONS

Communication dated Jul. 1, 2019, issued by the Federal Service for Intellectual Property in counterpart Russian Application No. 2017127706.

(Continued)

*Primary Examiner* — Ryan F Pitaro
(74) *Attorney, Agent, or Firm* — Sughrue Mion, PLLC

(57) ABSTRACT

Provided are a display apparatus and a display method. The display apparatus includes: a display configured to provide a plurality of item areas each of which displays at least a part of an item list including a plurality of items, wherein the display provides at least one item area, among the plurality of item areas, as a closed item area and provides at least one item area, among the plurality of item areas, as an open item area; and a controller configured to control the display to, in response to an input of a control apparatus that selects the closed item area, display at least some items of an item list corresponding to the closed item area on the open item area and to display at least some items of an item list corresponding to the open item area on the closed item area.

10 Claims, 40 Drawing Sheets

(51) Int. Cl.
*H04N 21/431* (2011.01)
*H04N 21/482* (2011.01)

(56) References Cited

U.S. PATENT DOCUMENTS

| | | | |
|---|---|---|---|
| 6,678,891 B1 | 1/2004 | Wilcox et al. | |
| 6,765,590 B1 | 7/2004 | Watahiki et al. | |
| 7,293,241 B1 | 11/2007 | Tornqvist et al. | |
| 7,634,789 B2 | 12/2009 | Gerba et al. | |
| 7,761,812 B2* | 7/2010 | Ostojic | H04N 5/44513 715/835 |
| 8,205,172 B2 | 6/2012 | Wong et al. | |
| 8,250,490 B2 | 8/2012 | Fujiwara et al. | |
| 8,756,502 B2* | 6/2014 | Hill | G06F 3/0482 715/702 |
| 8,850,326 B2 | 9/2014 | Gorodyansky | |
| 8,996,067 B2 | 3/2015 | Choe et al. | |
| 9,094,709 B2 | 7/2015 | Jeong et al. | |
| 9,965,146 B2 | 5/2018 | Lemay et al. | |
| 10,606,539 B2* | 3/2020 | Bernstein | G06F 3/021 |
| 10,732,996 B2* | 8/2020 | Dreessen | G06F 1/1692 |
| 2003/0076347 A1 | 4/2003 | Barrett et al. | |
| 2004/0169688 A1* | 9/2004 | Burdick | G06F 3/0482 715/854 |
| 2004/0205175 A1 | 10/2004 | Kammerer | |
| 2005/0177801 A1 | 8/2005 | Vronay et al. | |
| 2006/0248475 A1 | 11/2006 | Abrahamsson | |
| 2007/0101364 A1 | 5/2007 | Morita | |
| 2007/0256034 A1 | 11/2007 | Hiraoka et al. | |
| 2008/0001924 A1 | 1/2008 | de los Reyes et al. | |
| 2008/0024451 A1 | 1/2008 | Aimi et al. | |
| 2009/0044147 A1 | 2/2009 | Alringer | |
| 2009/0055729 A1* | 2/2009 | Audet | G06F 16/34 715/243 |
| 2009/0172598 A1 | 7/2009 | Yamanaka et al. | |
| 2009/0183075 A1 | 7/2009 | Kang et al. | |
| 2009/0222765 A1 | 9/2009 | Ekstrand | |
| 2009/0300146 A1 | 12/2009 | Park et al. | |
| 2009/0313567 A1 | 12/2009 | Kwon et al. | |
| 2009/0315867 A1* | 12/2009 | Sakamoto | G06F 3/03547 345/184 |
| 2011/0060988 A1 | 3/2011 | Mysliwy et al. | |
| 2011/0093897 A1* | 4/2011 | Gerba | H04N 21/4314 725/42 |
| 2011/0252383 A1 | 10/2011 | Miyashita | |
| 2012/0060187 A1* | 3/2012 | Moon | H04N 21/4312 725/41 |
| 2012/0084730 A1 | 4/2012 | Noma et al. | |
| 2013/0014059 A1* | 1/2013 | Nakayama | H04N 5/44543 715/835 |
| 2013/0036387 A1 | 2/2013 | Murata | |
| 2013/0145268 A1 | 6/2013 | Kukulski | |
| 2013/0145316 A1 | 6/2013 | Heo | |
| 2013/0145321 A1* | 6/2013 | Horiuchi | G06F 3/04883 715/830 |
| 2013/0219319 A1 | 8/2013 | Park et al. | |
| 2013/0278708 A1 | 10/2013 | Mock | |
| 2014/0026061 A1 | 1/2014 | Kim et al. | |
| 2014/0089851 A1 | 3/2014 | Wielgosz | |
| 2014/0129979 A1 | 5/2014 | Bae et al. | |
| 2014/0237357 A1 | 8/2014 | Meyer et al. | |
| 2014/0250015 A1 | 9/2014 | Lemay et al. | |
| 2014/0282232 A1 | 9/2014 | Oh et al. | |
| 2014/0337791 A1* | 11/2014 | Agnetta | G06F 3/0346 715/784 |
| 2014/0351724 A1 | 11/2014 | Kim et al. | |
| 2015/0046796 A1 | 2/2015 | Kim et al. | |
| 2015/0067585 A1 | 3/2015 | Won et al. | |
| 2015/0121271 A1* | 4/2015 | Huang | G06F 3/04842 715/769 |
| 2016/0070434 A1* | 3/2016 | Clark | G06F 3/04812 715/762 |
| 2016/0170585 A1 | 6/2016 | Amano et al. | |
| 2016/0200195 A1 | 7/2016 | Jun | |
| 2016/0283984 A1* | 9/2016 | Rabbat | G06Q 30/0269 |
| 2017/0206569 A1* | 7/2017 | Reiley | G06Q 30/0277 |
| 2018/0032203 A1* | 2/2018 | Sepulveda | G06F 3/04817 |
| 2018/0129382 A1 | 5/2018 | Yoshitomi et al. | |
| 2018/0137541 A1* | 5/2018 | Yelton | G06Q 30/0272 |

FOREIGN PATENT DOCUMENTS

| | | | | |
|---|---|---|---|---|
| CN | 102089744 A | 6/2011 | | |
| CN | 102835124 A | 12/2012 | | |
| CN | 103517149 A | 1/2014 | | |
| CN | 103686401 A | 3/2014 | | |
| EP | 1724998 A2 | 11/2006 | | |
| EP | 2525567 A2 | 11/2012 | | |
| EP | 3454180 A1 * | 3/2019 | | G06F 3/017 |
| JP | 2011-43809 A | 3/2011 | | |
| JP | 2014-52903 A | 3/2014 | | |
| KR | 10-2013-0095968 A | 8/2013 | | |
| KR | 10-2014-0091870 A | 7/2014 | | |
| KR | 10-2014-0139647 A | 12/2014 | | |
| RU | 2504821 C2 | 1/2014 | | |
| RU | 2518318 C2 | 6/2014 | | |
| RU | 2519481 C2 | 6/2014 | | |
| RU | 2530301 C2 | 10/2014 | | |

OTHER PUBLICATIONS

Communication dated Jun. 1, 2016, from the European Patent Office in counterpart European Application No. 16150034.3.
Communication dated Jun. 10, 2016, from the European Patent Office in counterpart European Application No. 16150034.3.
Communication dated May 10, 2018, from the State Intellectual Property Office of People's Republic of China in counterpart Application No. 201610006927.5.
International Search Report and Written Opinion, issued by International Searching Authority in corresponding International Application No. PCT/KR2015/014265, dated Apr. 5, 2016. (PCT/ISA/220, PCT/ISA/210 & PCT/ISA/237).
Office Action issued in parent U.S. Appl. No. 14/986,963 dated Jan. 24, 2018.
Notice of Allowance issued in parent U.S. Appl. No. 14/986,963 dated Jul. 30, 2018, 2018.
Communication dated Dec. 28, 2020 by the China National Intellectual Property Administration in Chinese Application No. 201910488873.4.
Communication dated Jan. 28, 2021 by the European Patent Office in European Application No. 20209285.4.
Communication dated Jan. 26, 2021 by the Korean Intellectual Property Office in Korean Application No. 10-2015-0000868.
Communication dated Jul. 2, 2021 issued by the Indian Patent Office in Indian Application No. 201624000007.
Communication dated Septembers, 2021 issued by the China National Intellectual Property Administration in Chinese Application No. 201910488873.4.

* cited by examiner

FIG. 1B
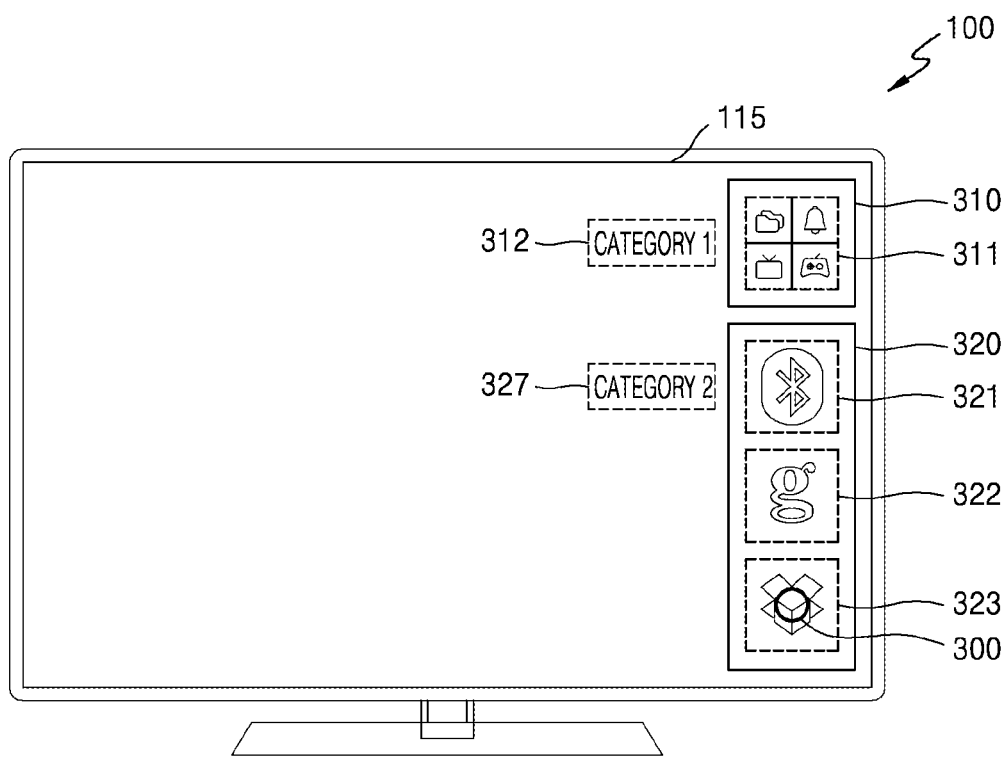
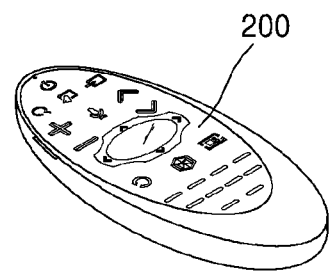

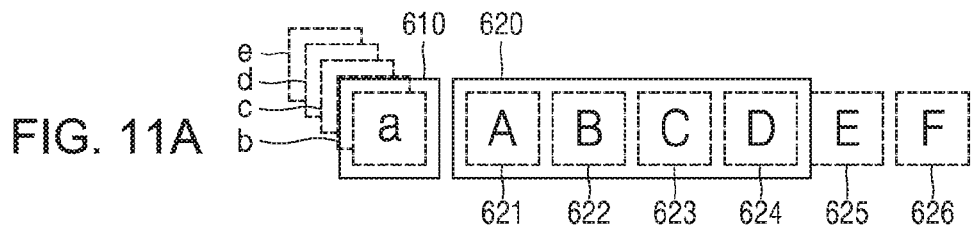
FIG. 11A
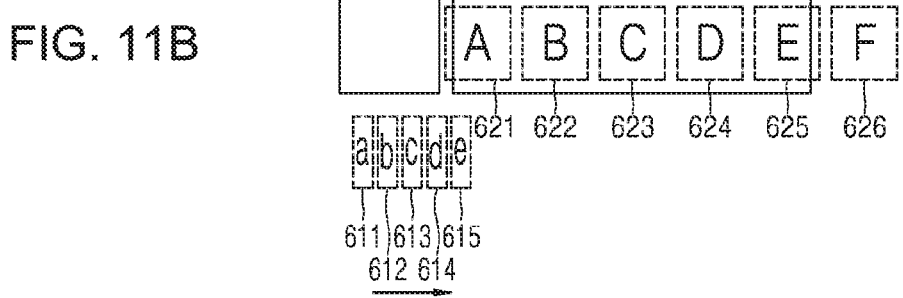
FIG. 11B
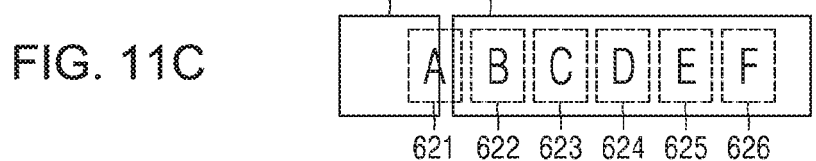
FIG. 11C
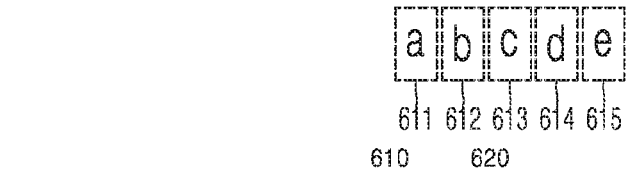
FIG. 11D
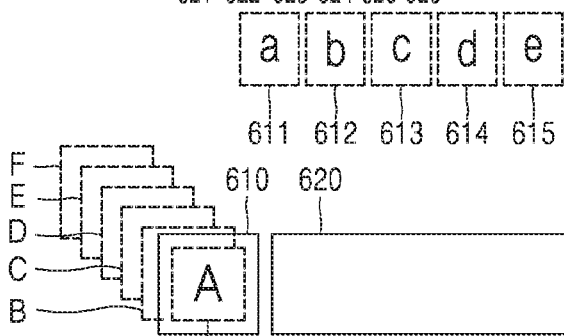
FIG. 11E

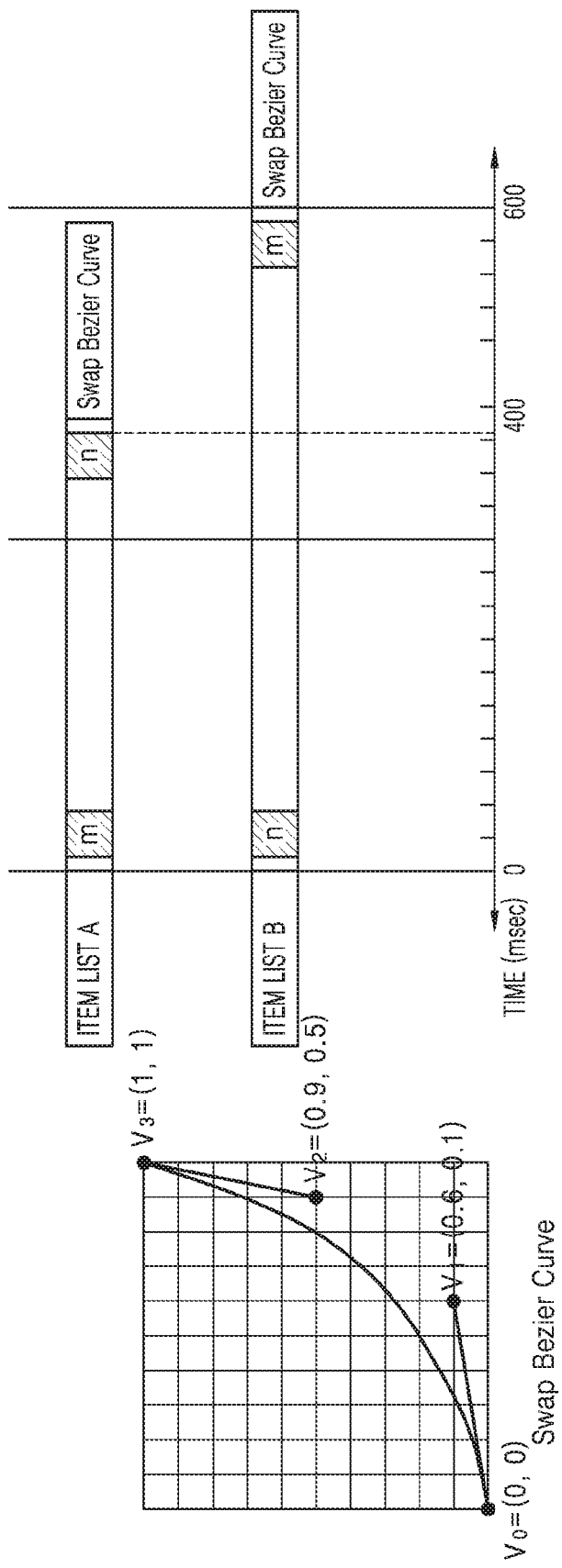

DISPLAY APPARATUS AND DISPLAY METHOD

CROSS-REFERENCE TO RELATED APPLICATION

This is a continuation of U.S. application Ser. No. 14/986,963 filed on Jan. 4, 2016, which claims the benefit of Korean Patent Application No. 10-2015-0000868, filed on Jan. 5, 2015, in the Korean Intellectual Property Office, the disclosures of which are incorporated herein in their entirety by reference.

BACKGROUND

1. Field

The present disclosure relates to display apparatuses and display methods, and more particularly, to display apparatuses that provide a plurality of item areas and display methods of the display apparatuses.

2. Description of the Related Art

Display apparatuses are capable of displaying images to users. Users may watch broadcast programs by using display apparatuses. A display apparatus displays, on a display, a broadcast program carried by a broadcast signal selected by a user from broadcast signals that are transmitted from broadcasting stations. The recent broadcast trend has evolved from analog broadcasting to digital broadcasting.

Digital broadcasting refers to the practice of transmitting a digital image and a voice signal. Digital broadcasting have many advantages over analog broadcasting, such as robustness against noise, low data loss, capability of error correction, and the ability to provide high-definition, clear images. Also, digital broadcasting allows interactive services, unlike analog broadcasting.

Also, smart TVs that have digital broadcasting functions and provide a variety of content have recently been introduced. Smart TVs do not operate passively according to users' selection, instead, Smart TVs could analyze and provide what the users want without the users' manipulation.

Also, smart TVs may perform item scrolling functions to improve viewer's interactive experiences and provide more information to the users.

SUMMARY

Provided are display apparatuses and display methods that may enable users to intuitively, naturally, and pleasantly enjoy items displayed by the display apparatuses.

Additional aspects will be set forth in part in the description which follows and, in part, will be apparent from the description, or may be learned by practice of the presented exemplary embodiments.

According to an aspect of an exemplary embodiment, a display apparatus is disclosed. The display apparatus includes: a display configured to provide a plurality of item areas, each item area displaying at least a part of an item list comprising at least one item, at least one item area, among the plurality of item areas, being a closed item area and at least one item area, among the plurality of item areas, being an open item area; and a controller configured to control the display to, in response to an input of a control apparatus that selects the closed item area, swap an item list displayed on the closed item area with an item list displayed on the open item area.

In response to an input of the control apparatus that selects at least one item displayed on the open item area, the controller may provide the selected at least one item in an active state.

The plurality of item areas may respectively correspond to a plurality of categories indicating features of a plurality of item lists.

The controller may control the display to continuously change size of at least one item of the item list, which are displayed on the closed item area and/or to continuously change position of the at least one item of the item list, which are displayed on the closed item area.

The controller may control the display to continuously change size of the at least one item of the item list, which is displayed on the open item area and/or to continuously change position of the at least one item of the item list, which is displayed on the open item area.

The controller may use at least one item area among the plurality of item areas as an area for displaying an item for a specific purpose.

The controller may control the display to display an advertisement item at a first position of the item list displayed on the open item area.

When the advertisement item is entirely displayed on the open item area, in response to an input of the control apparatus that selects the closed item area, the controller may control the display to continuously change sizes of items of the item list displayed on the open item area but maintains a size of the advertisement item.

According to an aspect of another exemplary embodiment, a display apparatus includes: a display providing a plurality of item areas each of which displays at least a part of an item list including a plurality of items, at least one item area, among the plurality of item areas, being a closed item area and at least one item area, among the plurality of item areas, being an open item area; and a controller controlling the display such that items of an item list corresponding to the closed item area are sliding on the closed item area.

The controller may divide the closed item area into a plurality of layers, and control the display to slide the items of the item list displayed on the closed item area on at least one layer among the plurality of layers.

According to an aspect of another exemplary embodiment, a display method includes: providing a plurality of item areas, each item area displaying at least a part of an item list including at least one item, at least one item area, among the plurality of item areas, being provided as a closed item area and at least one item area, among the plurality of item areas, being provided as an open item area; and in response to an input of a control apparatus which selects the closed item area, swapping an item list corresponding to the closed item area with an item list corresponding to the open item area.

According to an aspect of another exemplary embodiment, a display method includes: providing a plurality of item areas, each item area displaying at least a part of an item list including a plurality of items, at least one item area, among the plurality of item areas, being provided as a closed item area and at least one item area, among the plurality of item areas, being provided as an open item area; and displaying such that items of an item list corresponding to the closed item area slide on the closed item area.

BRIEF DESCRIPTION OF THE DRAWINGS

These and/or other aspects will become apparent and more readily appreciated from the following description of the exemplary embodiments, taken in conjunction with the accompanying drawings in which:

FIG. 1B is a diagram of the display apparatus that vertically provides item areas according to an exemplary embodiment;

FIGS. 11A through 11E are diagrams for explaining a process of swapping an item list corresponding to a closed item area with an item list corresponding to an open item area according to an exemplary embodiment;

FIGS. 12A and 12B show a curve that may be used to determine a speed at which positions of an item list corresponding to a closed item area and an item list corresponding to an open item area are continuously changed according to an exemplary embodiment;

DETAILED DESCRIPTION

Figure 1A:
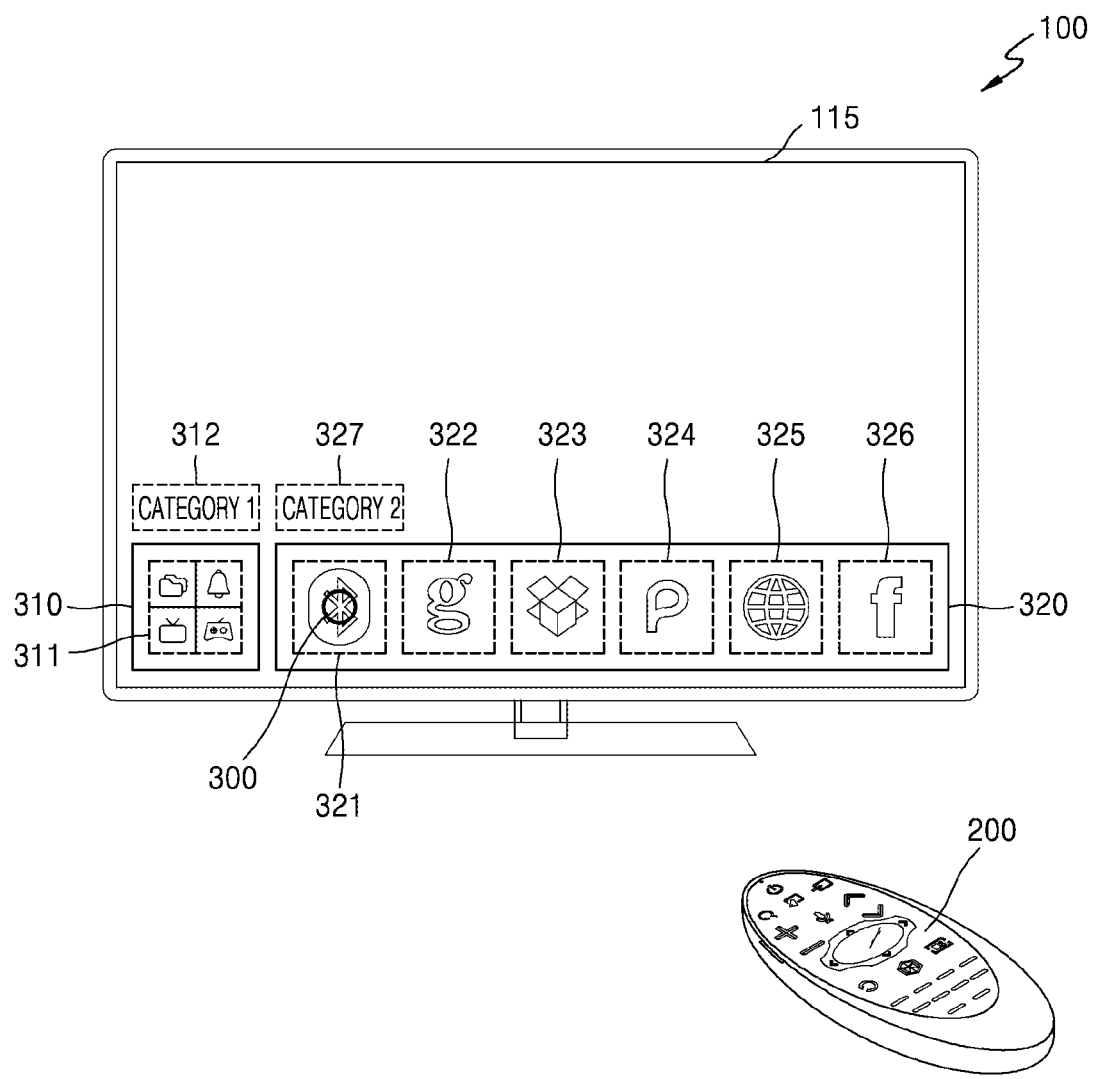
FIG. 1A is a diagram of a display apparatus that horizontally provides two item areas according to an exemplary embodiment.

Exemplary embodiments will be described more fully hereinafter with reference to the accompanying drawings. A method of configuring and using an electronic apparatus according to exemplary embodiments will be described more fully hereinafter with reference to the accompanying drawings. The same reference numerals in the drawings denote the same components or elements that perform the same functions.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or", includes any and all combinations of one or more of the associated listed items.

When a key provided in a control apparatus is selected, it may mean that the key is pressed, touched, or dragged.

The term 'content' used herein may include a video, an image, text, or a web document.

A portion of a display of a display apparatus on which actual content is output may be referred to as a screen.

The terminology used herein is for the purpose of describing exemplary embodiments only and is not intended to be limiting of exemplary embodiments. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof but do not preclude the presence or addition of one or more other features, integers, steps, operations, elements, components, and/or groups thereof.

As used herein, the term "and/or" includes any and all combinations of one or more of the associated listed items. Expressions such as "at least one of" when preceding a list of elements, modify the entire list of elements and do not modify the individual elements of the list.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit," which has to be implemented with specific hardware, and may be implemented with at least one processor.

The concept of a display operation according to an exemplary embodiment will now be explained with reference to FIGS. 1 through 1D.

FIG. 1A is a diagram of a display apparatus 100 that horizontally provides two item areas according to an exemplary embodiment.

FIG. 1A illustrates the display apparatus 100 that may communicate with a control apparatus 200 in a wired or wireless manner.

The control apparatus 200 may control the display apparatus 100 by using short-range communication such as Infrared communication or Bluetooth communication. A user may use the control apparatus 200 to control a function of the display apparatus 100 by using at least one of a key (including a button), a touchpad, a microphone that may receive the user's voice, and a sensor that may recognize a motion of the control apparatus 200.

The control apparatus 200 includes a power on/off button for turning on or off the display apparatus 100. The control apparatus 200 may change a channel of the display apparatus 100, adjust a volume, select terrestrial broadcasting, cable broadcasting, or satellite broadcasting, or set a configuration.

The display apparatus 100 may be a flat display apparatus, a curved display apparatus having a curved screen, or a flexible display apparatus that may adjust a curvature. Examples of an output resolution of the display apparatus 100 may include high definition (HD), full HD, ultra HD, and a resolution higher than ultra HD.

The term 'user' used herein refers to a person who controls a function or an operation of the display apparatus 100 by using the control apparatus 200 and examples of the user may include a viewer, a manager, and an installer.

The display apparatus 100 may provide a plurality of item areas in order to display a plurality of item lists corresponding to a plurality of categories on a display 115. When the display apparatus 100 provides a plurality of item areas, the display apparatus 100 may provide at least some of the plurality of item areas in a closed state and at least some of the plurality of item areas in an open state due to a limited display space of the display 115. An item area in a closed state may occupy only a small portion of the display space and thus may indicate that items corresponding to a category are included in this item list but not shown. An item area in an open state may occupy a large portion of the display space of the display 115 and thus items included in an item list corresponding to a category may be shown.

Also, the display apparatus 100 may display a cursor 300, which responds to an input of the control apparatus 200, on the display 115.

Referring to FIG. 1A, two item areas 310 and 320 are provided on the display 115. The item area 310 may correspond to a category 1, and a text 312 indicating the category 1 may be displayed on a portion above the item area 310 to indicate that the item area 310 corresponds to the category 1. Small images 311 showing items of an item list corresponding to the category 1 may be displayed on the item area 310. Each item list may include one or more item. The item area 310 may be in a closed state, and an image or images of one or a very small number of items in the item list corresponding to the category 1 may be displayed on the item area 310. Hereinafter, an item area in a closed state is referred as a closed item area. A closed item area is mostly used to indicate that an item list corresponding to a category exists. Items may not be scrolled on a closed item area. Also, items displayed on a closed item area may not be selected or may not be activated. However, it will be understood by one of ordinary skill in the art that even items displayed on a closed item area may be selected or activated.

Scrolling is an operation, which vertically or horizontally moves a text, an image, or a video across a monitor or a display of a computer or a television. Scrolling does not change a layout of text or an image but gradually moves the text or the image in a certain direction on the screen such that a user can view the text or the image after scrolling. Scrolling is often carried out on a computer by a control processor (CPU) or a graphics card.

The item area 320 may correspond to a category 2, and a text 327 indicating the category 2 may be displayed on a portion above the item area 320 to indicate that the item area 320 corresponds to the category 2. Items of an item list corresponding to the category 2 may be displayed on the item area 320. In FIG. 1A, items 321, 322, 323, 324, 325, and 326 are displayed on the item area 320. The item area 320 may be in an open state, and at least some items of the item list corresponding to the category 2 may be displayed on the item area 320. Hereinafter, an item area in an open state is referred to as an open item area. Items displayed on an open item area may be selected or may be activated. Also, the user may scroll the open item area 320 by using the control apparatus 200. Also, the user may select one of the items 321-326 displayed on the open item area 320 by using the control apparatus 200, and thus the selected item may be changed to an active state. Content corresponding to the item in the active state may be displayed on a part or whole of the display 115 of the display apparatus 100 and the user may use the content corresponding to the item in the active state.

In general, an item list including a plurality of items may be longer than an item area. Accordingly, the item list for the open item area 320 may be longer than the open item area 320 for displaying items, and thus only some of the items of the item list may be displayed on the open item area 320. Accordingly, when the user wants to continuously move items of the item list that are not shown on the open item area 320, the user clicks the cursor 300 on an edge of the open item area 320 to move the open item area 320 to the edge. The above operation is called edge scrolling. Accordingly, referring to FIG. 1A, the user may further perform scrolling on the far left of the open item area 320 by using the control apparatus 200 to display items, which are arranged at the left of the item 321, on the open item area 320. Also, the user may further perform scrolling on the far right of the open item area 320 to display items, which are arranged at the right of the item 326, on the open item area 320.

A plurality of item areas may be provided to respectively correspond to a plurality of categories. The plurality of categories may be set in various ways.

One of the categories may include items that are suggested by a service provider (e.g., FEATURED).

One of the categories may include items that are recently activated by the user (e.g., RECENT).

One of the categories may include, for example, advertisement items.

One of the categories may include items (e.g., preferred channels) that are preferred by the user.

It will be understood by one of ordinary skill in the art that movie items, game items, news items, etc. may be set in various ways as categories.

Each item may indicate content. Examples of an item indicating content may include an item indicating image content, such as a movie or a drama, an item indicating audio content, such as music, an item indicating an application, an item indicating a broadcast channel, and an item indicating history information of content executed by the user.

A plurality of items may be displayed as images. For example, when an item indicates content of a movie or a drama, the item may be displayed as an image of a movie or drama poster. Also, when an item indicates audio content such as music, the item may be displayed as an image of a music album poster. Also, when an item indicates an application, the item may be displayed as an image of the application or a screen shot of the application. Also, when an item indicates a broadcast channel, the item may be displayed as an image of a latest screen shot of the broadcast channel or an image of a program that is being currently broadcast. Also, when an item indicates history information of content that is executed by the user, the item may be displayed as an image of a latest screen shot of the content.

Also, an item may indicate an interface for connecting the display apparatus 100 to an external apparatus or may indicate an external apparatus that is connected to the display apparatus 100. For example, an item indicating an interface for connecting an external apparatus may indicate a port of an image display apparatus to which the external apparatus is connected. Examples of an item indicating an external apparatus may include an item indicating an HD multimedia interface (HDMI) port, an item indicating a component jack, an item indicating a PC port, and an item indicating a universal serial bus (USB) port. Also, an item indicating an external apparatus may indicate the external apparatus that is connected to an interface.

The cursor 300 is an indicator that is used to show a position on a computer monitor or a display apparatus, in response to a text input or a pointing device, in a computing apparatus. An indicator that is used to show a position on a display in response to an input of a pointing device, such as a mouse, is generally called a pointer. Referring to FIG. 1A, when the user moves the control apparatus 200, the cursor 300 may correspondingly move to a position on the screen of the display 115.

Referring to FIG. 1A, the cursor 300 is displayed on the screen of the display 115 to correspond to a pointing position of the control apparatus 200. Although the cursor 300 has a circular shape in FIG. 1A, it will be understood by one of ordinary skill in the art that the present exemplary embodiment is not limited thereto and the cursor 300 may have any of various other shapes.

In response to the user's input that selects the closed item area 310 corresponding to the category 1 by using the control apparatus 200, the display apparatus 100 may display the item list of the category 1 corresponding to the closed item area 310 on the open item area 320, and may display the item list of the category 2 corresponding to the open item area 320 on the closed item area 310. As such, when a plurality of item lists corresponding to a plurality of categories are provided on a limited display space, the user may effectively use the limited display space by displaying an item list of a category which the user does not want to currently operate on a closed item area so as to reduce a waste of a display portion and displaying only an item list of a category which the user wants to currently operate on an open item area so as for the user to operate items displayed on the open item area.

Although the closed and open item areas 310 and 320 are horizontally arranged and thus item scrolling is horizontally performed on the open item area 320 in FIG. 1A, it will be understood by one of ordinary skill in the art that the closed and open item areas 310 and 320 may be vertically arranged, may be arranged on the top of the display 115, may be vertically arranged on a left portion of the display 115, or may be arranged on a central portion of the display 115.

FIG. 1B is a diagram of the display apparatus 100 that vertically provides item areas according to an exemplary embodiment.

Referring to FIG. 1B, the closed item area 310 corresponding to the category 1 is arranged on the top right of the screen of the display 115, and the small images 311 of some items of the item list corresponding to the closed item area 310 are displayed on the closed item area 310. The open item area 320 corresponding to the category 2 is arranged on a right portion of the display 115 to be disposed under the closed item area 310, and the items 321, 322, and 323 are displayed on the open item area 320.

In response to the user's input that selects the closed item area 310 corresponding to the category 1 by using the control apparatus 200, the display apparatus 100 may display the item list of the category 1 corresponding to the closed item area 310 on the open item area 320, and may display the item list of the category 2 corresponding to the open item area 3250 on the closed item area 310.

Figure 1C:
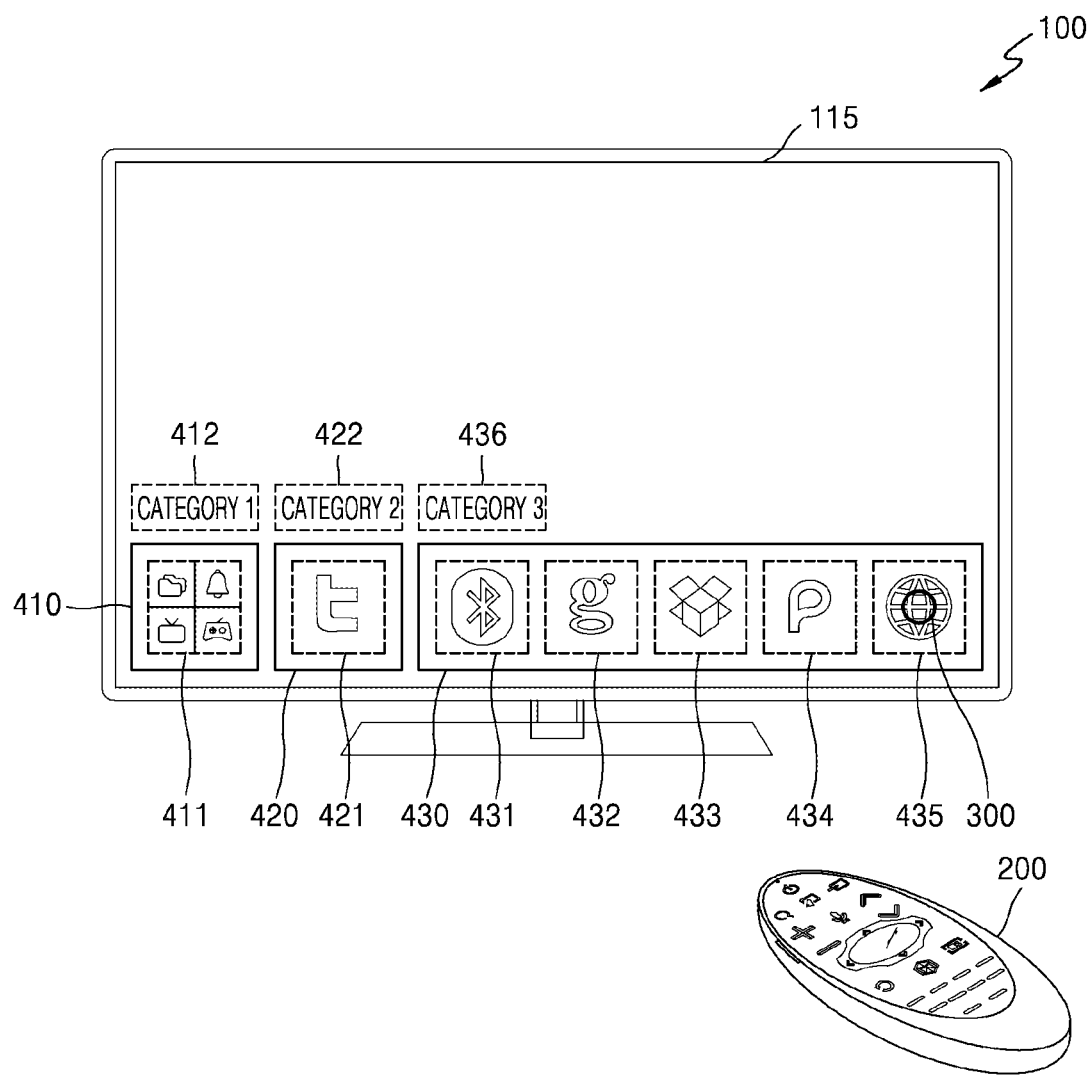
FIG. 1C is a diagram of the display apparatus that provides three item areas according to an exemplary embodiment.

FIG. 1C is a view of the display apparatus 100 that provides three item areas according to an exemplary embodiment.

Referring to FIG. 1C, the display apparatus 100 provides an item area 410 corresponding to a category 1, an item area 420 corresponding to a category 2, and an item area 430 corresponding to a category 3. A text 412 for indicating that the item area 410 corresponds to the category 1 is displayed on a portion above the item area 410, and small images 411 of some items of an item list of the category 1 are displayed on the item area 410. A text 422 for indicating that the item area 420 corresponds to the category 2 is displayed on a portion above the item area 420, and an item 421 is displayed on the item area 420. A text 436 for indicating that the item area 430 corresponds to the category 3 is displayed on a portion above the item area 430, and items 431, 432, 433, 434, and 435 are displayed on the item area 430.

The item area 410 corresponding to the category 1 and the item area 420 corresponding to the category 2 are in closed states, and items on the closed item area 410 and the closed item area 420 may not be scrolled, selected, and activated.

The item area 430 corresponding to the category 3 is in an open state, and the items 431, 432, 433, 434, and 435 are displayed and may be scrolled by using the control apparatus 220 and may be selected and activated.

According to an exemplary embodiment, in response to the user's input that selects the closed item area 410 corresponding to the category 1 by using the control apparatus 200, the display apparatus 100 may display an item list corresponding to the closed item area 410 on the open item area 430, and may display an item list corresponding to the open item area 430 on the closed item area 410. The closed item area 420 during this time may remain in the closed state without being changed.

According to an exemplary embodiment, in response to the user's input that selects the closed item area 420 corresponding to the category 2 by using the control apparatus 200, the display apparatus 100 may display an item list corresponding to the closed item area 420 on the open item area 430 and may display the item list corresponding to the open item area 430 on the closed item area 420. The closed item area 410 during this time may remain in the closed state without being changed.

Figure 1D:
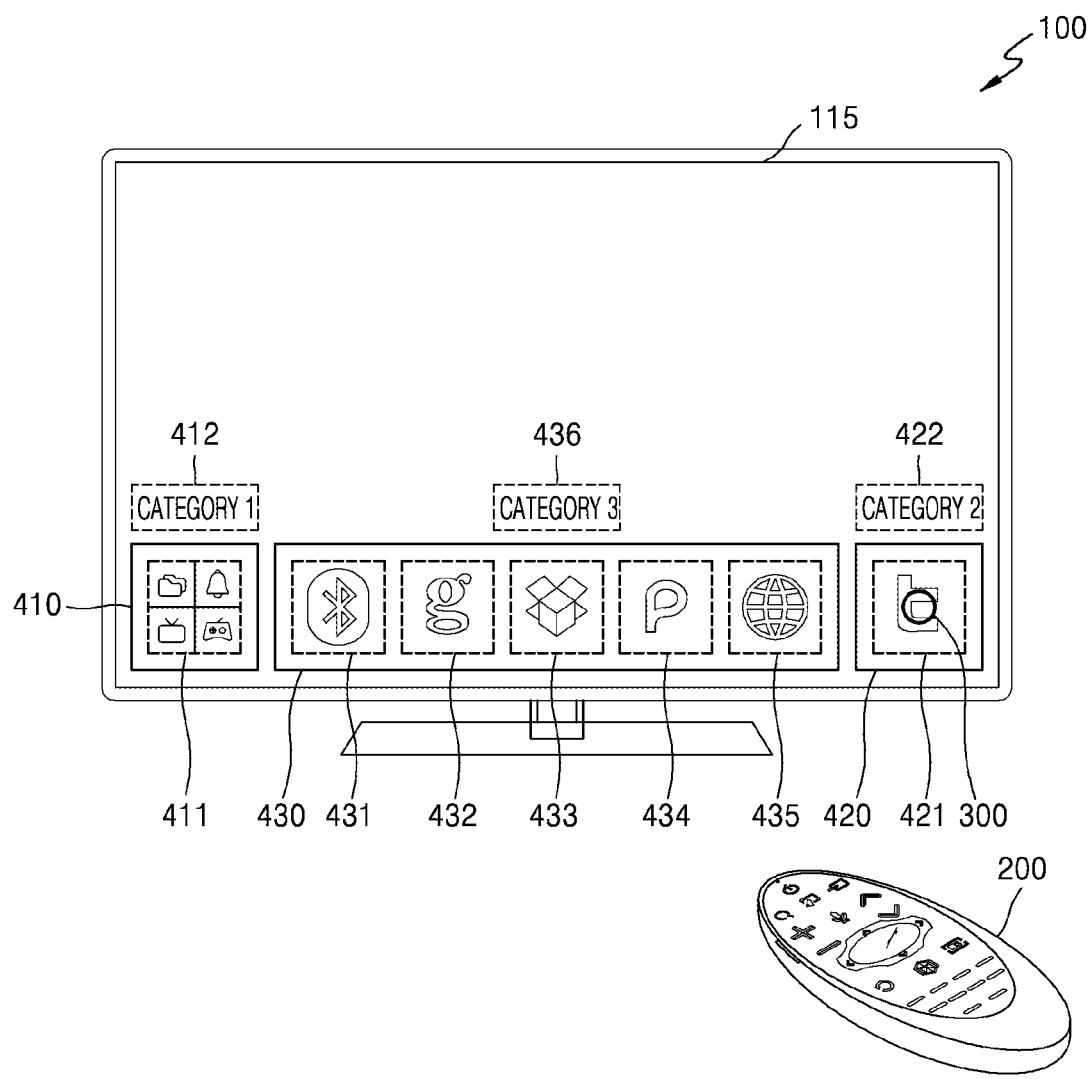
FIG. 1D is a diagram of a display apparatus that provides three item areas according to an exemplary embodiment.

FIG. 1D is a view of the display apparatus 100 that provides three item areas according to an exemplary embodiment.

Referring to FIG. 1D, the display apparatus 100 provides the closed item area 410 corresponding to the category 1, the closed item area 420 corresponding to the category 2, and the open item area 430 corresponding to the category 3. As shown in FIG. 1D, the display apparatus 100 provides three item areas, like in FIG. 1C, but the three item areas are arranged in a different way from that in FIG. 1C. The open item area 430 corresponding to the category 3 may be arranged on the bottom of the screen of the display 115 between the closed item areas 410 and 420.

As described with reference to FIGS. 1A through 1D, the display apparatus 100 may provide a plurality of item areas to the display 115, and may provide at least one of the plurality of item areas in an open state and may provide at least one of the plurality of item areas in a closed state.

According to an exemplary embodiment, in response to an input of the control apparatus 200 that selects a closed item area, the display apparatus 100 may control the display 115 to display an item list corresponding to the closed item area on an open item area and to display an item list corresponding to the open item area on the closed item area. As such, since a plurality of item areas and item lists of categories respectively corresponding to the plurality of item areas are provided and each item list is switched between an open state and a closed state, items may be effectively provided in various ways to the user and the user may pleasantly enjoy interfaces.

Figure 2:
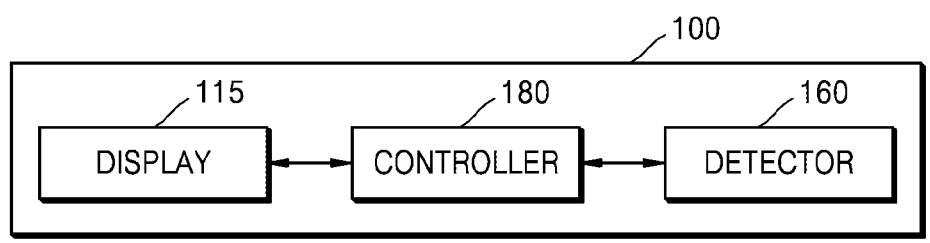
FIG. 2 is a block diagram of the display apparatus according to an exemplary embodiment.

FIG. 2 is a block diagram of the display apparatus 100 according to an exemplary embodiment.

Referring to FIG. 2, the display apparatus 100 includes the display 115, a controller 180, and a detector 160.

The display 115 according to an exemplary embodiment outputs the cursor 300 to the screen in response to an input of the control apparatus 200 under the control of the controller 180.

The display 115 according to an exemplary embodiment provides an item area on which a plurality of items are arranged on the screen.

In response to an input of the control apparatus 200 that selects at least one item area in a closed state under the control of the controller 180, the display 115 according to an exemplary embodiment displays at least some items of an item list corresponding to the closed item area on an open item area and displays at least some items of an item list corresponding to the open item area on the closed item area.

The display 115 according to an exemplary embodiment may provide at least one item area among a plurality of item areas as an area for displaying an item for a specific purpose under the control of the controller 180.

The display 115 according to an exemplary embodiment may display items corresponding to a closed item area in a sliding manner, on the closed item area.

The controller 180 may receive a signal corresponding to a pointing position of the control apparatus 200 that is received through the detector 160, and may control the display 115 to determine and display the cursor 300 having a specific shape at a specific position according to the signal corresponding to the pointing position.

The controller 180 may receive a signal that selects a closed item area of the control apparatus 200 that is received through the detector 160, and may control the display 115 to switch an item list corresponding to the closed item area and an item list corresponding to the open item area. That is, through this switch, at least some items of the item list displayed on the closed item area are switched to be displayed on the open item area and at least some items of the item list displayed on the open item area are switched to be displayed on the closed item area.

The controller 180 may control the display 115 to provide at least one item area among a plurality of item areas as an area for displaying an item for a specific purpose.

The controller 180 may control the display 115 to display items corresponding to a closed item area in a sliding manner, on the closed item area.

Figure 3:
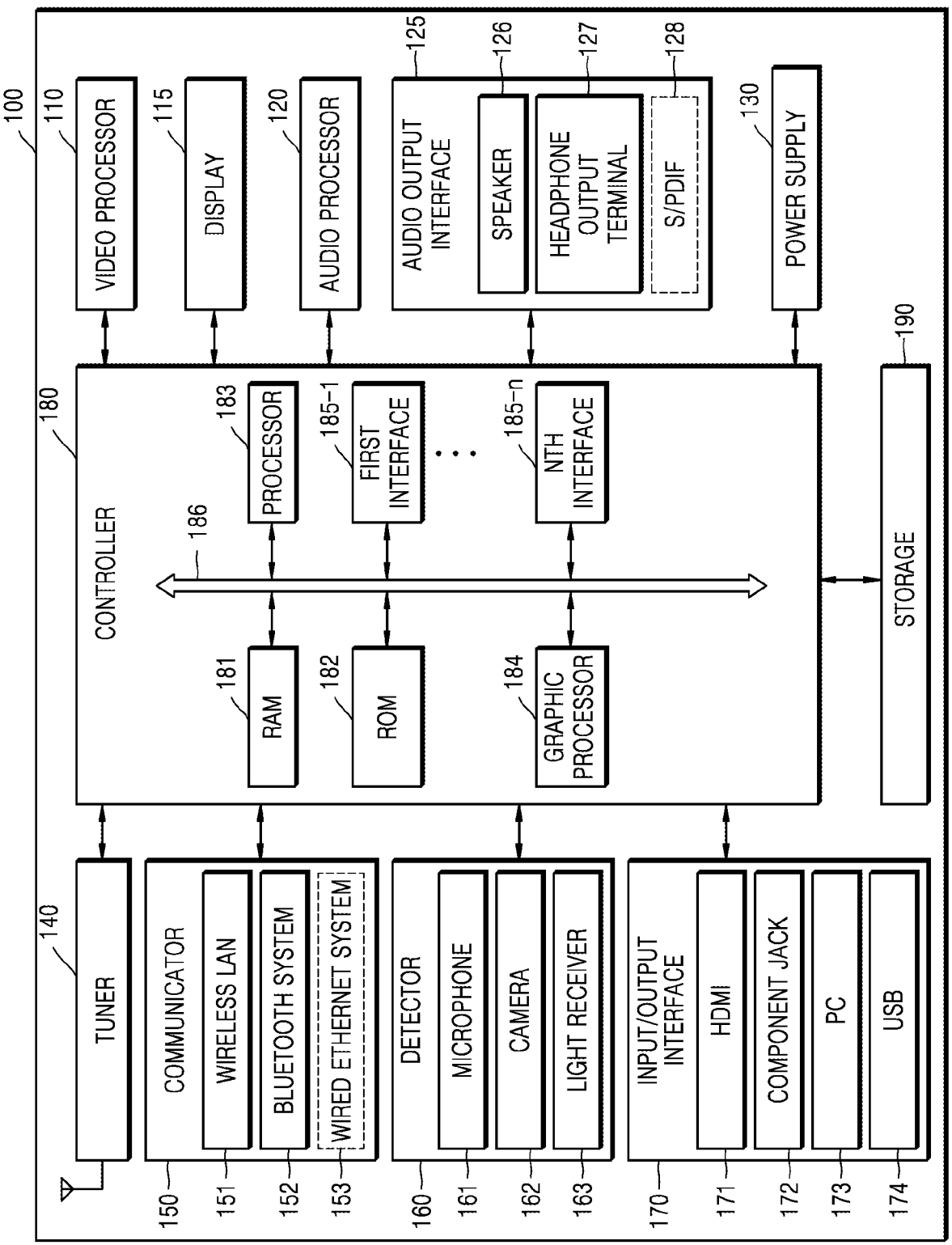
FIG. 3 is a detailed block diagram of the display apparatus according to an exemplary embodiment.

FIG. 3 is a detailed block diagram of the display apparatus 100 according to an exemplary embodiment.

Referring to FIG. 3, the display apparatus 100 includes a video processor 110, the display 115, an audio processor 120, an audio output interface 125, a power supply 130, a tuner 140, a communicator 150, the detector 160, an input/output interface 170, the controller 180, and a storage 190.

The video processor 110 processes video data that is received by the display apparatus 100. The video processor 110 may perform various image processing, such as decoding, scaling, noise filtering, frame rate conversion, or resolution conversion on the video data.

The display 115 displays, on the screen, a video carried by a broadcast signal that is received through the tuner 140 under the control of the controller 180. Also, the display 115 may display content (e.g., a moving image) that is input through the communicator 150 or the input/output interface 170. The display 115 may output an image that is stored in the storage 190 under the control of the controller 180. Also, the display 115 may display a voice user interface (UI) (including a voice command guide) for performing a voice recognition task corresponding to voice recognition or a motion user interface (UI) (including a user motion guide) for performing a motion recognition task corresponding to motion recognition.

The display 115 according to an exemplary embodiment may display the cursor 300 on the screen in response to an input of the control apparatus 200 under the control of the controller 180.

The display 115 according to an exemplary embodiment may provide a plurality of item areas each of which displays at least one item, and may provide at least one item area of the plurality of item areas in a closed state and may provide at least one item area of the plurality of item areas in an open state, under the control of the controller 180.

In response to an input of the control apparatus 200 that selects a closed item area, the display 115 according to an exemplary embodiment may display at least some items of an item list corresponding to the closed item area on an open item area and may display at least some items of an item list corresponding to the open item area on the closed item area, under the control of the controller 180.

When the at least some items of the item list corresponding to the open item area are displayed on the closed item area, the display 115 according to an exemplary embodiment may continuously change sizes of items of the item list corresponding to the open item area, under the control of the controller 180.

When the at least some items of the item list corresponding to the closed item area are displayed on the open item area, the display 115 according to an exemplary embodiment may continuously change sizes of items of the item list corresponding to the closed item area, under the control of the controller 180.

The display 115 according to an exemplary embodiment may provide at least one item area of the plurality of item areas as an area for displaying an item for a specific purpose, under the control of the controller 180.

The display 115 according to an exemplary embodiment may arrange and output an advertisement item at a first position of the item list corresponding to the open item area, under the control of the controller 180.

When the advertisement item is entirely displayed on the open item area, in response to an input of the control apparatus 200 that selects the closed item area, the display 115 according to an exemplary embodiment may continuously change sizes of items displayed on the open item area while maintaining the displayed advertisement item, under the control of the controller 180.

When the advertisement item is partially displayed on the open item area, in response to an input of the control apparatus 200 that selects the closed item area, the display 115 according to an exemplary embodiment may continuously change sizes of items displayed on the open item area, including the advertisement item, under the control of the controller 180.

The display 115 according to an exemplary embodiment may slide items corresponding to the closed item area, on the closed item area, under the control of the controller 180.

Also, the display 115 according to an exemplary embodiment may divide the closed item area into a plurality of layers, and may slide the corresponding items on at least one layer of the plurality of layers, under the control of the controller 180.

The audio processor 120 processes audio data. The audio processor 120 may perform various processing operations, such as decoding, amplification, or noise filtering, on the audio data. The audio processor 120 may include a plurality of audio processing modules in order to process audio signals corresponding to a plurality of pieces of content.

The audio output interface 125 outputs an audio signal carried by a broadcast signal that is received through the tuner 140 under the control of the controller 180. The audio output interface 125 may output an audio signal (e.g., a voice or a sound) that is input through the communicator 150 or the input/output interface 170. Also, the audio output interface 125 may output an audio signal stored in the storage 190 under the control of the controller 180. The audio output interface 125 may include at least one of a speaker 126, a headphone output terminal 127, and a Sony/Philips digital interface (S/PDIF) output terminal 128. Alternatively, the audio output interface 125 may include a combination of the speaker 126, the head phone output terminal 127, and the S/PDIF output terminal 128.

The power supply 130 supplies power that is input from an external power supply source to elements (i.e., 110 through 190) of the display apparatus 100 under the control of the controller 180. Also, the power supply 130 may supply power that is output from one or more batteries in the display apparatus 100 to the elements 110 through 190 under the control of the controller 180.

The tuner 140 may tune and select only a frequency of a channel to be received by the display apparatus 100 from among propagation components by performing amplification, mixing, or resonance on a broadcast signal that is received in a wired or wireless manner. The broadcast signal includes an audio, a video, and additional information (e.g., an electronic program guide (EPG)).

The tuner 140 may receive a broadcast signal in a frequency band corresponding to a channel number (e.g., a cable broadcast channel 506) according to the user's input (e.g., a control signal that is received from the control apparatus 200, for example, a channel number input, a channel up-down input, or a channel input on an EPG screen).

The tuner 140 may receive a broadcast signal from any of various sources such as a terrestrial broadcast source, a cable broadcast source, a satellite broadcast source, or an Internet broadcast source. The tuner 140 may receive a broadcast signal from a source such as analog broadcasting or digital broadcasting. The broadcast signal that is received by the tuner 140 is decoded by using, for example, audio decoding, video decoding, or additional information decoding, and is separated into an audio, a video, and/or additional information. The separated audio, video, and/or additional information may be stored in the storage 190 under the control of the controller 180.

The display apparatus 100 may include one or more tuners 140. When the display apparatus 100 includes a plurality of the tuners 140 according to an exemplary embodiment, the display apparatus 100 may output a plurality of broadcast signals on a plurality of windows constituting a multi-window screen that is provided on the display 115.

The tuner 140 may be integrated into the display apparatus 100 in an all-in-one manner, or may be connected to a separate apparatus (e.g., a set-top box that is electrically connected to the display apparatus 100 or to the input/output interface 170.

The communicator 150 may connect the display apparatus 100 to an external apparatus (e.g., an audio apparatus) under the control of the controller 180. The controller 180 may transmit/receive content to/from the external apparatus that is connected to the controller 180 through the communicator 150, may download an application from the external apparatus, or may perform web browsing. The communicator 150 may include one of a wireless local area network (LAN) 151, a Bluetooth system 152, and a wired Ethernet system 153 according to a performance and a structure of the display apparatus 100. Alternatively, the communicator 150 may include a combination of the wireless LAN 151, the Bluetooth system 152, and the wired Ethernet system 153. The communicator 150 may receive a control signal of the control apparatus 200 under the control of the controller 180. The control signal may be a Bluetooth signal, an RF signal, or a WiFi signal.

The communicator 150 may further include a short-range communication system (e.g., a near-field communication (NFC) system (not shown) or a Bluetooth low energy (BLE) system (not shown)) other than the Bluetooth system 152.

The detector 160 detects the user's voice, image, or interaction.

The microphone 161 receives the user's uttered voice. The microphone 161 may convert the received voice into an electrical signal and may output the electrical signal to the controller 180. The user's voice may include, for example, a voice corresponding to a menu or a function of the display apparatus 100. A recommended recognition range of the microphone 161 may be about 4 meters between the microphone 161 and the user's position, and may vary according to the user's voice tone and an ambient environment (e.g., a speaker's sound or an ambient noise).

The microphone 161 may be integrated into or separated from the display apparatus 100. When the microphone 161 is separated from the display apparatus 100, the microphone 161 may be electrically connected to the display apparatus 100 through the communicator 150 or the input/output interface 170.

It will be understood by one of ordinary skill in the art that the microphone 161 may be omitted according to a performance and a structure of the display apparatus 100.

The camera 162 receives an image (e.g., continuous frames) corresponding to the user's motion including a gesture in a recognition range. For example, the recognition range of the camera 162 may be 0.1 mm to 5 mm between the camera 162 and the user's position. The user's motion may include, for example, a motion of the user's body part or region such as the user's face, facial expression, hand, fist, or finger. The camera 162 may convert the received image into an electrical signal and may output the electrical signal to the controller 180 under the control of the controller 180.

The controller 180 may select a menu displayed on the display apparatus 100 by using a result of motion recognition or may perform control corresponding to the result of motion recognition. For example, the controller 180 may change a channel, adjust a volume, or move an indicator.

The camera 162 may include a lens and an image sensor. The camera 162 may support optical zooming or digital zooming by using a plurality of lenses and image processing. A recognition range of the camera 162 may be set to vary according to an angle of a camera and an ambient environment condition. When the camera 162 includes a plurality of cameras, the camera 162 may receive 3D still images or 3D moving images by using the plurality of cameras.

The camera 162 may be integrated into or separated from the display apparatus 100. When the camera 162 is separated from the display apparatus 100, a separate apparatus (not shown) including the camera 152 may be electrically connected to the display apparatus 100 through the communicator 150 or the input/output interface 170.

It will be understood by one of ordinary skill in the art that the camera 162 may be omitted according to a performance and a structure of the display apparatus 100.

The light receiver 163 receives an optical signal (including a control signal) from the control apparatus 200 that is outside the light receiver 163 through a light window or the like in a bezel of the display 115. The light receiver 163 may receive an optical signal corresponding to the user's input (e.g., a touch, a push, a touch gesture, a voice, or a motion) from the control apparatus 200. The control signal may be extracted from the received optical signal under the control of the controller 180.

According to an exemplary embodiment, the light receiver 163 may receive a signal corresponding to a pointing position of the control apparatus 200 and may transmit the signal to the controller 180.

The input/output interface 170 receives a video (e.g., a moving image), an audio (e.g., a voice or music), and additional information (e.g., an EPG) from the outside of the display apparatus 100 under the control of the controller 180. The input/output interface 170 may include one of a high-definition multimedia interface (HDMI) port 171, a component jack 172, a PC port 173, and a USB port 174. Alternatively, the input/output interface 170 may include a combination of the HDMI port 171, the component jack 172, the PC port 173, and the USB port 174.

It will be understood by one of ordinary skill in the art that the input/output interface 170 may be configured and operate in various ways.

The controller 180 controls an overall operation of the display apparatus 100 and signal transmission/reception between the elements 110-190 of the display apparatus 100 and processes data. When the user's input occurs or satisfies a preset condition, the controller 180 may execute an operation system (OS) and various applications that are stored in the storage 190.

The controller 180 may include a random-access memory (RAM) 181 that stores a signal or data input from the outside of the display apparatus 100 or stores a signal or data related to various operations performed in the display apparatus 100, a read-only memory (ROM) 182 that stores a control program for controlling the display apparatus 100, and a processor 183.

The processor 183 may include a graphics processor (GPU) for performing graphics processing on a video. The processor 183 may be provided as a system-on-chip (SoC) in which a core is combined with a GPU. The processor 183 may include a single-core, a dual-core, a triple-core, a quad-core, and a multiple core thereof.

Also, the processor 183 may include a plurality of processors. For example, the processor 183 may include a main processor and a sub-processor that operates in a sleep mode.

A graphic processor 184 generates a screen including various objects such as an icon, an image, and text by using a calculator and a renderer. The calculator calculates an attribute value such as a coordinate value, a shape, a size, or a color of each object according to a layout of the screen by using the user's interaction that is detected through the detector 160. The renderer generates the screen having any layout including the object based the attribute value that is calculated by the calculator. The screen generated by the renderer is displayed within a display area of the display 115.

According to an exemplary embodiment, the graphic processor 184 may generate the cursor 300 to be displayed on the screen in response to an input of the control apparatus 200, under the control of the controller 180.

According to an exemplary embodiment, the graphic processor 184 may generate an image of each item and a plurality of item areas under the control of the controller 180.

According to an exemplary embodiment, the graphic processor 184 may generate item lists in an open state and in a closed state under the control of the controller 180.

According to an exemplary embodiment, the graphic processor 184 may continuously change sizes of items corresponding to an open item area under the control of the controller 180.

According to an exemplary embodiment, the graphic processor 184 may continuously change sizes of items corresponding to a closed item area under the control of the controller 180.

According to an exemplary embodiment, the graphic processor 184 may generate graphics that slide items corresponding to a closed item area under the control of the controller 180.

First through nth interfaces 185-1-185-n are connected to the various elements. One of the first through nth interfaces 185-1-185-n may be a network interface that is connected to an external apparatus.

The RAM 181, the ROM 182, the processor 183, the graphic processor 184, and the first through nth interfaces 185-1 through 185-n may be connected to one another via an internal bus 186.

The term 'controller' of the display apparatus 100 used herein includes the processor 183, the ROM 182, and the RAM 181.

The controller 180 may receive pointing position information of the control apparatus 200 through at least one of the light receiver 163 that receives light from the control apparatus 200 and a panel key provided on a side surface or a rear surface of the display apparatus 100.

According to an exemplary embodiment, the controller 180 may control the display 115 to provide a plurality of item areas. Each of the item areas displays at least one item. In addition, at least one item area of the plurality of item areas may be in a closed state and at least one item area of the plurality of item areas may be in an open state.

According to an exemplary embodiment, in response to an input of the control apparatus 200 that selects a closed item area, the controller 180 may control the display 115 to display at least some items of an item list corresponding to the closed item area on an open item area and to display at least some items of an item list corresponding to the open item area on the closed item area.

According to an exemplary embodiment, in response to an input of the control apparatus 200 that selects at least one item displayed on the open item area, the controller 180 may provide the selected item in an active state.

According to an exemplary embodiment, when the at least some items of the item list corresponding to the open item area are switched to be displayed on the closed item area, the controller 180 may control the display 115 to continuously change and display sizes of items of the item list corresponding to the open item area.

According to an exemplary embodiment, when the at least some items of the item list corresponding to the closed item area are switched to be displayed on the open item area, the controller 180 may control the display 115 to continuously change and display sizes of items of the item list corresponding to the closed item area.

According to an exemplary embodiment, the controller 180 may provide at least one item area among the plurality of item areas as an area for displaying an item for a specific purpose.

According to an exemplary embodiment, the controller 180 may control the display 115 to arrange and output an advertisement item at a first position of the item list corresponding to the open item area.

According to an exemplary embodiment, when the advertisement item is entirely displayed on the open item area, in response to an input of the control apparatus 200 that selects the closed item area, the controller 180 may control the display 115 to continuously change and output sizes of items displayed on the open item area while maintaining the displayed advertisement item.

According to an exemplary embodiment, when the advertisement item is partially displayed on the open item area, in response to an input of the control apparatus 200 that selects the closed item area, the controller 180 may control the display 115 to continuously change and output sizes of items, including the advertisement item, displayed on the open item area.

According to an exemplary embodiment, the controller 180 may control the display 115 to slide and output items corresponding to the closed item area, on the closed item area.

According to an exemplary embodiment, the controller 180 may divide the closed item area into a plurality of layers, and may control the display 115 to slide and output the items corresponding to the closed item area on at least one layer of the plurality of layers.

It will be understood by one of ordinary skill in the art that the controller 180 may be configured and operate in various ways.

The storage 190 may store various data, programs, or applications for driving and controlling the display apparatus 100 under the control of the controller 180. The storage 190 may store signals or data that are input/output according to operations of the video processor 110, the display 115, the audio processor 120, the audio output interface 125, the power supply 130, the tuner 140, the communicator 150, the detector 160, and the input/output interface 170. The storage 190 may store a control program for controlling the display apparatus 100 and the controller 180, an application that is initially provided by a manufacturer or downloaded from the outside, a GUI related to the application, an object (e.g., an image, text, an icon, or a button) for providing the GUI, user information, a document, databases, or related data.

The term 'storage' according to an exemplary embodiment includes the storage 190, the ROM 182 or the RAM 181 of the controller 180, or a memory card (e.g., a micro secure digital (SD) card or a USB memory) that is mounted in the display apparatus 100. Also, the storage 190 may include a nonvolatile memory, a volatile memory, a hard disk drive (HDD), or a solid-state drive (SSD).

The storage 190 may include a broadcast reception module, a channel control module, a volume control module, a communication control module, a voice recognition module, a motion recognition module, a light reception module, a display control module, an audio control module, an external input control module, a power control module, a power supply control module of an external apparatus that is connected through wireless communication (e.g., Bluetooth), a voice database (DB), or a motion DB. The modules and the DBs (not shown) of the storage 190 that are not shown) may be configured so software for the display apparatus 100 to perform functions of broadcast reception control, channel control, volume control, communication control, voice recognition, motion recognition, light reception control, audio control, external input control, power control, and display control of controlling the cursor 300 or a scrolled item to be displayed. The controller 180 may perform each function by executing the software that is stored in the storage 190.

According to an exemplary embodiment, the storage 190 may store user setting information that is received through one of the light receiver 163, the panel key, the microphone 161, and the camera 162. User setting may include the user setting information for setting categories corresponding to a plurality of item areas.

According to an exemplary embodiment, the storage 190 may store an image corresponding to each item.

The storage 190 may store a video or an image corresponding to a visual feedback.

The storage 190 may store a sound corresponding to an auditory feedback.

The storage 190 may include a presentation module. The presentation module is a module for configuring a display screen. The presentation module includes a multimedia module for reproducing and outputting multimedia content and an UI rendering module for performing UI and graphics processing. The multimedia module may include a player module, a camcorder module, and a sound processing module. Accordingly, the multimedia module may reproduce a variety of multimedia content and may generate and reproduce a screen and a sound. The UI rendering module may include an image composition module that combines images, a coordinate combination module that combines and generates coordinates on a screen on which an image is to be displayed, an X11 module that receives various events from hardware, and a two-dimensional/three-dimensional (2D/3D) UI toolkit that provides a tool for forming a 2D or 3D UI.

Also, the display apparatus 100 including the display 115 may be electrically connected to a separate external apparatus (e.g., a set-top box) including a tuner. For example, it will be understood by one of ordinary skill in the art that the display apparatus 100 may be, but is not limited to, an analog TV, a digital TV, a 3D-TV, a smart TV, a light-emitting diode (LED TV), an organic light-emitting diode (OLED) TV, a plasma TV, or a monitor.

The display apparatus 100 may include a sensor (e.g., an illumination sensor or a temperature sensor) that detects an internal or external state of the display apparatus 100.

At least one element may be added to or omitted from the elements (e.g., 110 through 190) of the display apparatus 100 of FIG. 3 according to a performance or a structure of the display apparatus 100. Also, it will be understood by one of ordinary skill in the art that positions of the elements (e.g., 110 through 190) may vary according to a performance or a structure of the display apparatus 100.

Figure 4A:
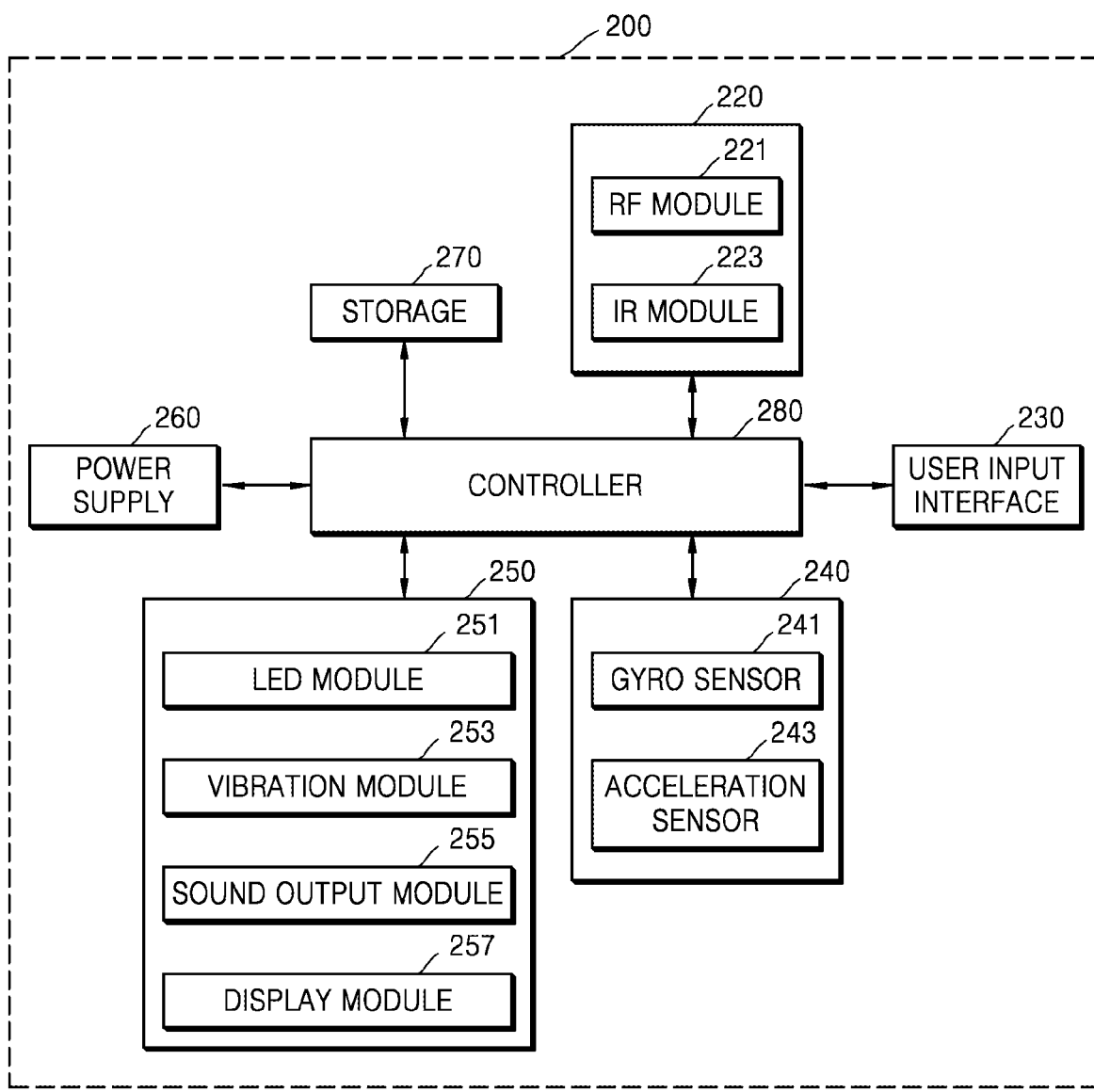
FIGS. 4A through 4B are diagrams illustrating a configuration of a control apparatus according to an exemplary embodiment.
Figure 4B:
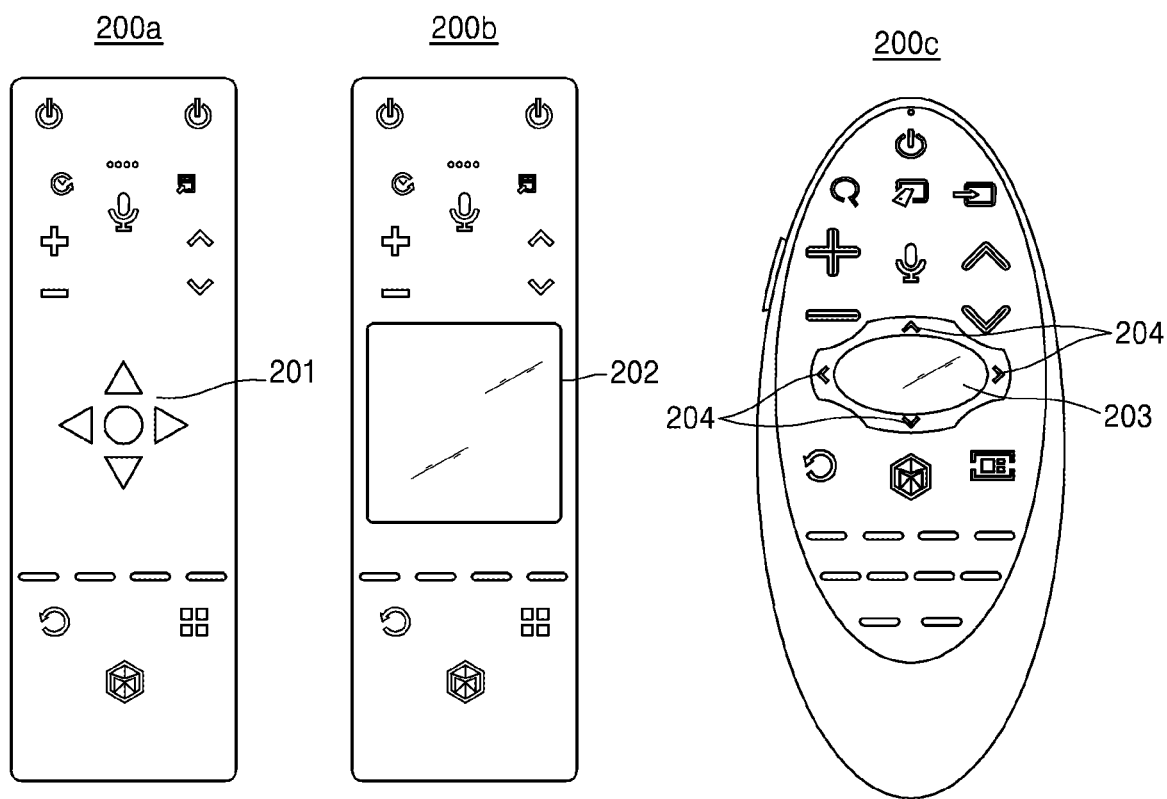

FIGS. 4A through 4B are block diagrams illustrating a configuration of the control apparatus 200 according to an exemplary embodiment.

Referring to FIG. 4A, the control apparatus 200 may include a wireless communicator 220, a user input interface 230, a sensor unit 240, an output unit 250, a power supply 260, a storage 270, and a controller 280.

The wireless communicator 220 may transmit/receive a signal to/from the display apparatus 100 according to the exemplary embodiments. The wireless communicator 220 may include a radio frequency (RF) module 221 that may transmit/receive a signal to/from the display apparatus 100 according to the RF communication standard. Also, the control apparatus 200 may include an infrared (IR) module that may transmit/receive a signal to/from the display apparatus 100 according to the IR communication standard.

In the present exemplary embodiment, the control apparatus 200 transmits a signal containing information about a movement of the control apparatus 200 to the display apparatus 100 through the RF module 221.

Also, the control apparatus 200 may receive a signal that is transmitted from the display apparatus 100 through the RF module 221. Also, if necessary, the control apparatus 200 may transmit a command to turn on/off power, change a channel, or change a volume to the display apparatus 100 through the IR module 223.

The user input interface 230 may include a keypad, a button, a touchpad, or a touch-screen. The user may input a command related to the display apparatus 100 to the control apparatus 200 by manipulating the user input interface 230. When the user input interface 230 includes a hard key button, the user may input a command related to the display apparatus 100 to the control apparatus 200 by pushing the hard key button. When the user input interface 230 includes a touch-screen, the user may input a command related to the display apparatus 100 to the control apparatus 200 by touching a soft key of the touch-screen.

For example, the user input interface 230 may include a 4-direction button or a 4-direction key 201, as shown in a control apparatus 200a of FIG. 4B. The 4-direction button or the 4-direction key 201 may be used to control a window, an area, an application, or an item displayed on the display 115. The 4-direction button or the 4-direction key 201 may be used to order upward, downward, leftward, and rightward movements. Also, it will be understood by one of ordinary skill in the art that the user input interface 230 includes a 2-direction button or a 2-direction key, instead of the 4-direction button or the 4-direction key 201.

Also, the user input interface 230 may include any of input units that may be manipulated by the user, such as a scroll key or a jog key.

Also, the user input interface 230 may include a touchpad 202, like in a control apparatus 200b of FIG. 4B. The user input interface 230 according to an exemplary embodiment may receive the user' input that drags, touches, or flips the touchpad 202 of the control apparatus 200. Also, the display apparatus 100 may be controlled according to a type of the received user's input (e.g., a direction in which a drag command is input or a time at which a touch command is input).

The sensor unit 240 may include a gyro sensor 241 or an acceleration sensor 243. The gyro sensor 241 may sense information about a movement of the control apparatus 200. For example, the gyro sensor 241 may sense information about an operation of the control apparatus 200 along x, y, and z-axes. The acceleration sensor 243 may sense information about a speed at which the control apparatus 200 moves. The sensor unit 240 may further include a distance measurement sensor, and thus may detect a distance between the sensor unit 240 and the display apparatus 100.

Referring to FIG. 4B, the control apparatus 200c according to an exemplary embodiment may be a pointing device including both a 4-direction key 204 and a touchpad 203. That is, when the control apparatus 200 is a pointing device, a function of the display apparatus 100 may be controlled according to an inclination direction or an angle by using the gyro sensor 241 of the control apparatus 200.

The output unit 250 may output an image or a voice signal in response to a manipulation of the user input interface 230 or a signal that is received from the display apparatus 100. The user may recognize whether the user input interface 230 is manipulated or the display apparatus 100 is controlled, by using the output unit 250.

For example, the output unit 250 may include an LED module 251 that could emit lights, a vibration module 253 that generates vibration, a sound output module 255 that outputs a sound, or a display module 257 that outputs an image when the user input interface 230 is manipulated or a signal is transmitted/received to/from the display apparatus 100 through the wireless communicator 220.

The power supply 260 supplies power to the control apparatus 200. When the control apparatus 200 does not move for a predetermined period of time, the power supply 260 may stop supplying power to reduce power consumption. When a predetermined key of the control apparatus 200 is manipulated, the power supply 260 may resume power supply.

The storage 270 may store various programs and application data that are necessary to control or operate the control apparatus 200.

The controller 280 controls general operations related to the control apparatus 200. The controller 280 may transmit a signal corresponding to a movement of the control apparatus 200 that is sensed by the sensor unit 240 or a signal corresponding to a manipulation of a predetermined key of the user input interface 230, to the display apparatus 100 through the wireless communicator 220.

The display apparatus 100 may include a coordinate value calculation unit that may calculate a coordinate value of the cursor 300 corresponding to an operation of the control apparatus 200.

The coordinate value calculation unit may correct handshake or an error from a signal corresponding to the operation of the control apparatus 200 that is detected and may calculate a coordinate value (x, y) of the cursor 300 to be displayed on the display 115.

Also, a transmission signal of the control apparatus 200 that is detected through the detector 130 is transmitted to the controller 180 of the display apparatus 100. The controller 180 may distinguish information about an operation of the control apparatus 200 and a key manipulation from the signal that is transmitted from the control apparatus 200, and may control the display apparatus 100 according to the information.

Alternatively, the control apparatus 200 may calculate a coordinate value of the cursor 300 corresponding to an operation of the control apparatus 200 and may transmit the coordinate value to the display apparatus 100. In this case, the display apparatus 100 may transmit information about the coordinate value of the cursor 300 that is received without correction of hand-shake or an error to the controller 180.

According to an exemplary embodiment, the user may control a position of the cursor 300 to be displayed on the screen of the display 115 by using a direction key, a touchpad, and a pointing function of the control apparatus 200.

Also, according to an exemplary embodiment, the user may select a closed item area displayed on the screen of the display 115 by using the direction key, the touchpad, and the pointing function of the control apparatus 200.

Figure 5:
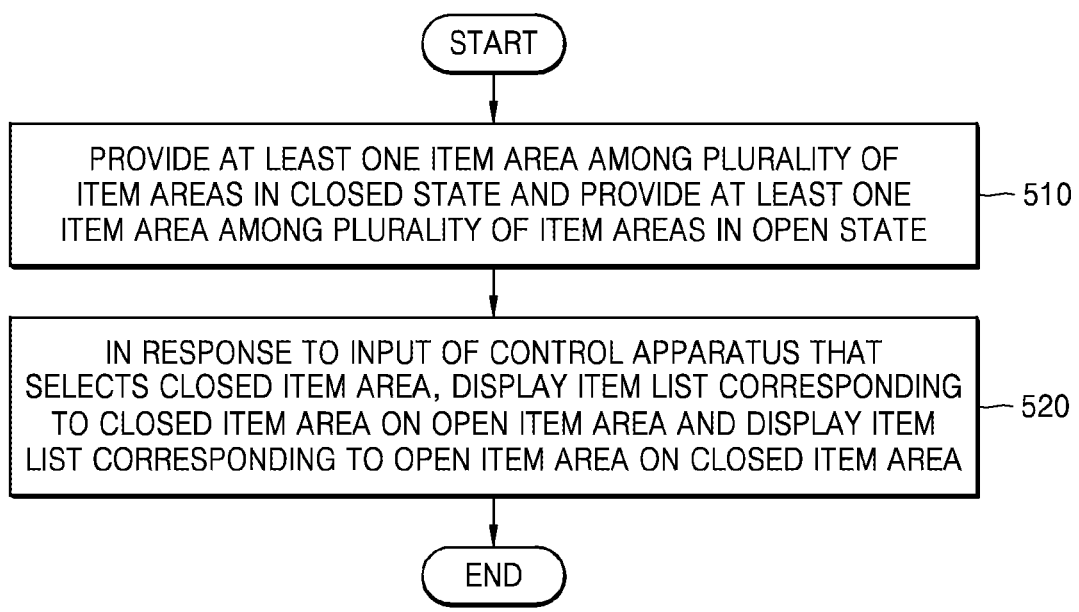
FIG. 5 is a flowchart of a display method of the display apparatus according to an exemplary embodiment.

FIG. 5 is a flowchart of a display method of the display apparatus 100 according to an exemplary embodiment.

Referring to FIG. 5, in operation 510, the display apparatus 100 provides at least one item area among a plurality of item areas in a closed state, and provides at least one item area among the plurality of item areas in an open state.

Referring to FIGS. 3 through 4B, when the user indicates a position on the screen of the display 115 of the display apparatus 100 by using the control apparatus 200 as, for example, a pointing device, the detector 160 of the display apparatus 100 receives an input signal corresponding to the position indicated by the control apparatus 200 and the controller 180 calculates coordinates on the screen on which the cursor 300 is to be output in response to the received input signal. Also, the controller 180 controls the display 115 to display the cursor 300 on the calculated position on the screen.

Next, referring to FIG. 5, in operation 520, in response to an input of the control apparatus 200 that selects a closed item area, the display apparatus 100 displays at least some items of an item list corresponding to the closed item area on an open item area and displays at least some items of an item list corresponding to the open item area on the closed item area. In other words, the item list originally corresponding to the closed item area and the item list originally corresponding to the open item area switches their places.

Referring to FIGS. 3 through 4B, when the user operates the control apparatus 200 to select the closed item area arranged on the screen of the display 115 of the display apparatus 100 by using the control apparatus 200 as, for example, a pointing device, the detector 160 of the display apparatus 100 receives a signal corresponding to an input of the control apparatus 200 and the controller 180, in response to the received signal, controls the graphic processor 184 to display the item list corresponding to the closed item area on the open item area and to display the item list corresponding to the open item area on the closed item area.

Figure 6A:
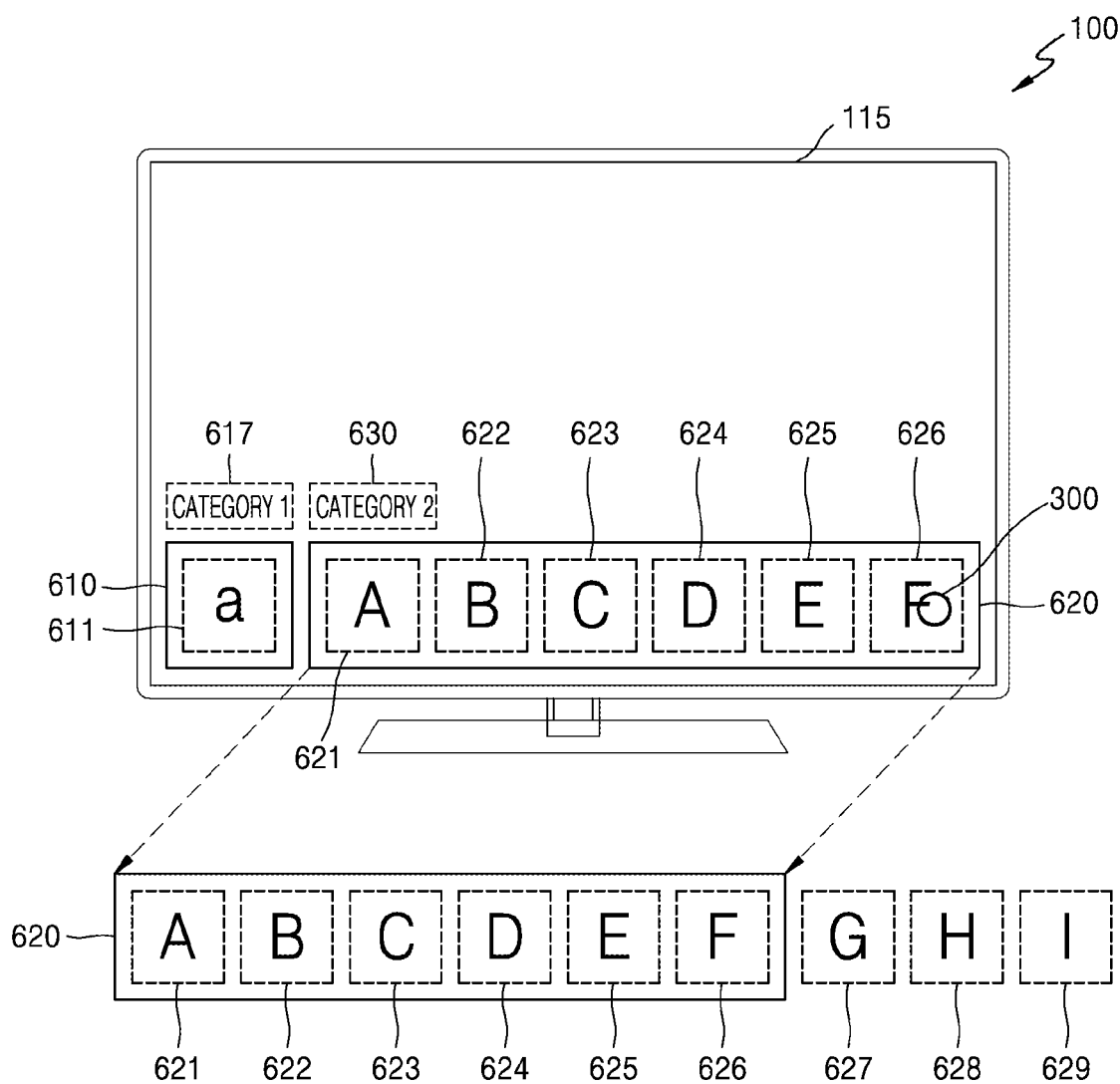
FIGS. 6A through 6C are diagrams of the display apparatus that swaps an item list corresponding to an open item area with an item list corresponding to a closed item area according to an exemplary embodiment.
Figure 6B:
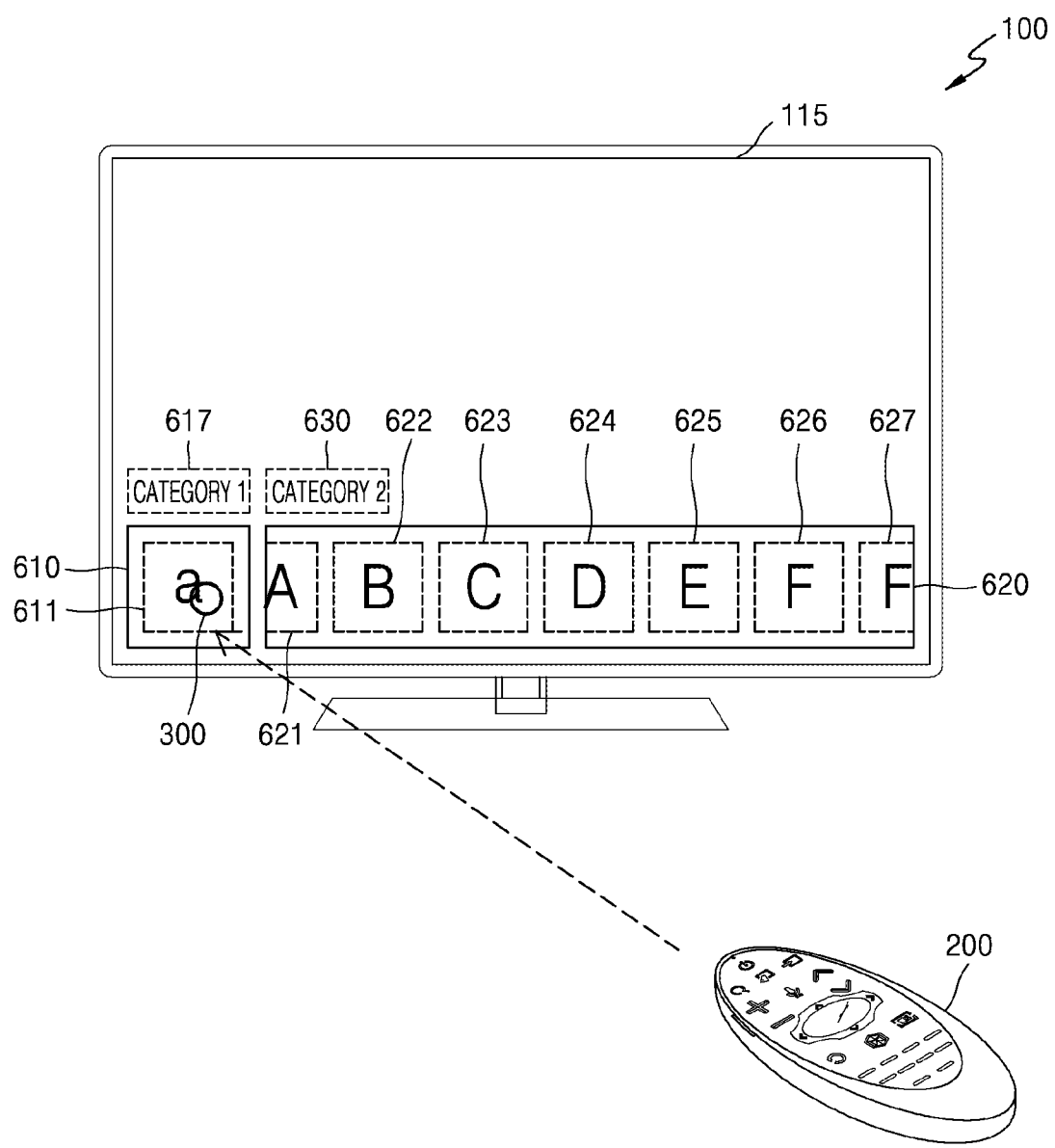
Figure 6C:
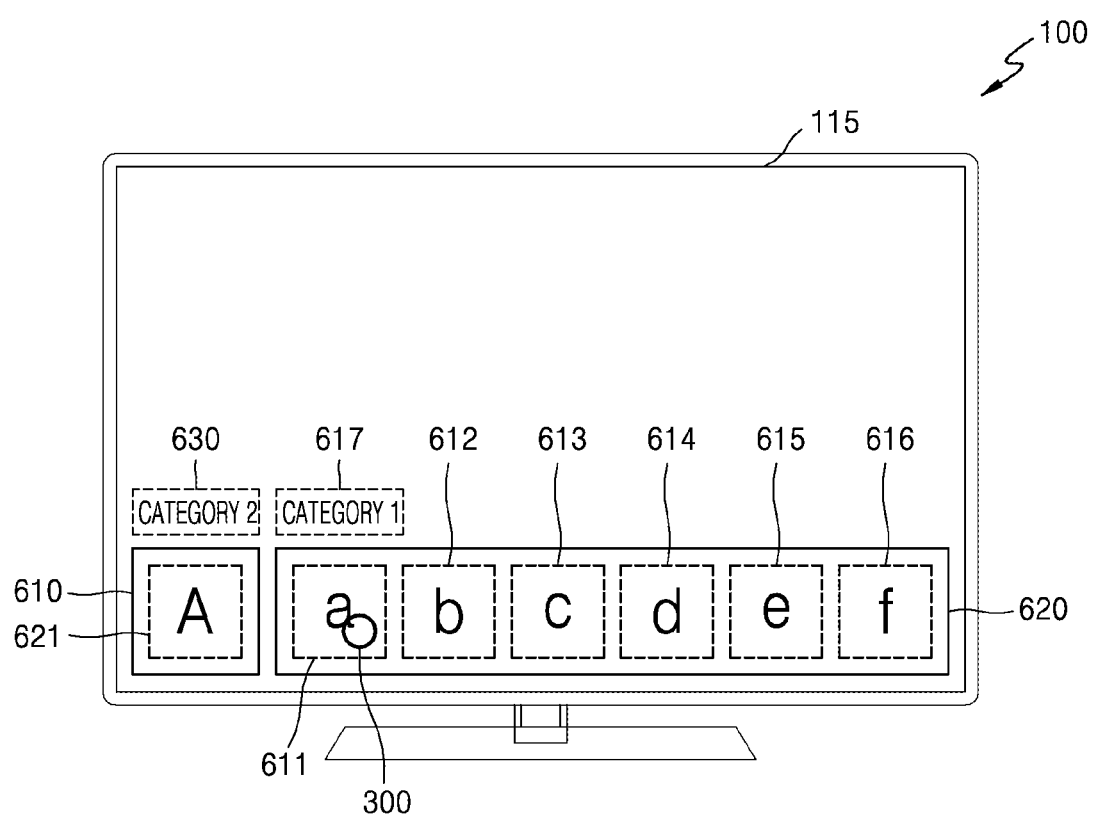

FIGS. 6A through 6C are diagrams of the display apparatus 100 that swaps an item list corresponding to an open item area with an item list corresponding to a closed item area according to an exemplary embodiment.

Referring to FIG. 6A, the display apparatus 100 provides an item area 610 corresponding to a category 1 and an item area 620 corresponding to a category 2 on the display 115. A text 617 for indicating that the item area 610 corresponds to the category 1 is displayed above the item area 610 and an item 611 is displayed on the item area 610. A text 630 for indicating that the item area 620 corresponds to the category 2 is displayed above the item area 620 and items A 621, B 622, C 623, D 624, E 625, and F 626 are displayed on the item area 620.

The item area 610 may be in a closed state, and one or a small number of items in an item list corresponding to the category 1 may be displayed on the closed item area 610. A closed item area is used to indicate that an item list corresponding to a category exists. On the closed item area 610, items may not be scrolled. Also, items displayed on a closed item area may not be selected or activated. However, it will be understood by one of ordinary skill in the art that even items displayed on a closed item area may be selected or activated.

Some of items corresponding to the closed item area 610 may be displayed as small images, or an image of only one item may be displayed.

Items displayed on the open item area 620 may be selected, scrolled, or activated.

When the display apparatus 100 receives an input of the control apparatus 200 that selects an item displayed on the open item area 620, the display apparatus 200 may activate and output the selected item on the entire screen.

Also, the user may scroll the open item area 620 by using the control apparatus 200. Referring to FIG. 6A, the item list that may be displayed on the open item area 620 includes the item A 621 through an item I 629. Accordingly, the user may display the item G 627 that is on the right of the item F 626 on the open item area 620 by performing rightward scrolling on the open item area 620 by using the control apparatus 200.

Referring to FIG. 6B, due to the rightward scrolling on the open item area 620 by using the control apparatus 200, the item A 621 that is a first item of the open item area 620 is partially covered and the item G 627 is partially displayed on the open item area 620.

When an input that selects the closed item area 610 is received from the control apparatus 200, the display apparatus 100 displays the item list corresponding to the open item area 620 on the closed item area 610 and displays the item list corresponding to the closed item area 610 on the open item area 620.

The display apparatus 100 that swaps the item list of the closed item area 610 with the item list of the open item area 620 and outputs the swapping result is illustrated in FIG. 6C.

Referring to FIG. 6C, items a 611, b 612, b 613, d 614, e 615, and f 616 that are items corresponding to the category 1 that originally corresponds to the closed item area 610 are swapped to be displayed on the open item area 620.

The item list corresponding to the open item area 620 is switched to be displayed on the closed item area 610, and only the item A 621 among items corresponding to the category 2 is displayed on the closed item area 610.

Also, the display apparatus 100 may display the text 617 indicating the category 1 on a portion above the open item area 620 and may display the text 630 indicating the category 2 on a portion above the closed item area 610, in order to indicate that the item list displayed on the open item area 620 corresponds to the category 1.

According to an exemplary embodiment, when the item list corresponding to the open item area 620 is displayed on the closed item area, the display apparatus 100 may continuously change sizes of items and output the size-changed items of the item list.

FIGS. 7A through 7E are reference diagrams for explaining a process of continuously changing sizes of items and outputting size-changed items corresponding to an open item area according to an exemplary embodiment.

Figure 7A:
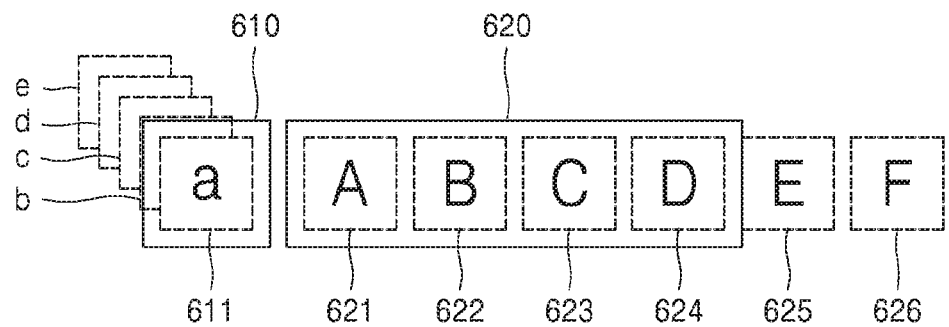
FIGS. 7A through 7E are diagrams for explaining a process of continuously changing sizes of items and outputting size-changed items corresponding to an open item area according to an exemplary embodiment.

Referring to FIG. 7A, the items a 611, b 612, c 613, d 614, and e 615 correspond to the closed item area 610, and only the item a 611 is displayed on the closed item area 610. The items A 621, B 622, C 623, and D 624 are displayed on the open item area 620, and the items E 625 and F 626 are not displayed on the open item area 620.

In FIG. 7A, in response to an input of the control apparatus 200 that selects the closed item area 610, the display apparatus 100 may continuously change sizes of items and output size-changed items corresponding to the open item area 620.

Figure 7B:
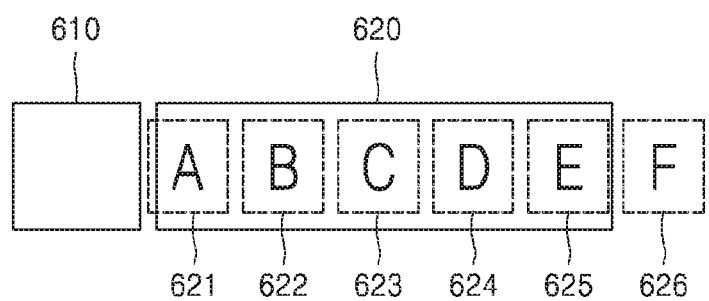

Referring to FIG. 7B, widths of the items A 621, B 622, C 623, D 624, E 625, and F 626 corresponding to the open item area 620 are reduced and output. Positions at which the items A 621, B 622, C 623, D 624, E 625, and F 626 are output may be continuously changed as well. The positions are more to the left than those in FIG. 7A. Also, the item list displayed on the closed item area 610 will be explained below with reference to FIGS. 9A through 9D.

Figure 7C:
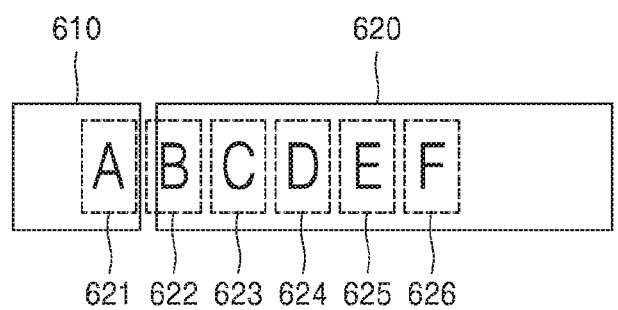
Figure 7D:
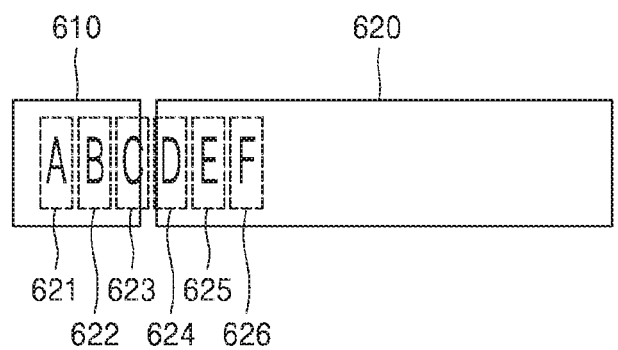
Figure 7E:
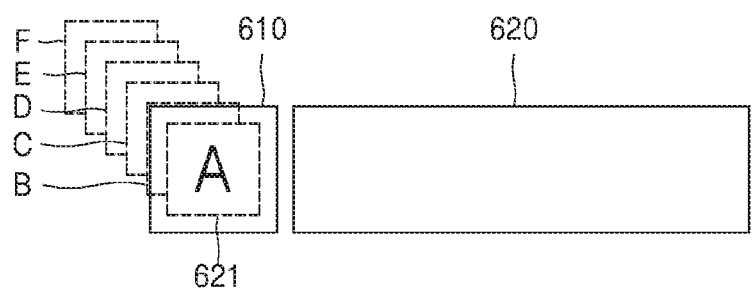

Also, as time passes, referring to FIG. 7C, widths of the items A 621, B 622, C 623, D 624, E 625, and F 626 are reduced to be less than those in FIG. 7B and the size-changed items are output. As time passes, referring to FIG. 7D, widths of the items A 621, B 622, C 623, D 624, E 625, and F 626 are further reduced to be less than those in FIG. 7C. As time passes, referring to FIG. 7E, movements of the items A 621, B 622, C 623, D 624, E 625, and F 626 to the closed item area 610 are completed, and only the item A 621 is displayed on the closed item area 610.

As such, in response to an input of the control apparatus 200 that selects the closed item area 610, the display apparatus 100 may continuously change sizes of items of the item list corresponding to the open item area 620 and continuously change the display positions of the size-changed items, and finally all the items corresponding to the open item area 620 are positioned on the closed item area 610. The user may intuitively enjoy a process of displaying the item list corresponding to the open item area 620 on the closed item area 610.

Also, according to an exemplary embodiment, a speed at which sizes of items corresponding to the open item area 620 are continuously changed may not be linear, and may have a specific curved shape.

Figures 8A, 8B:
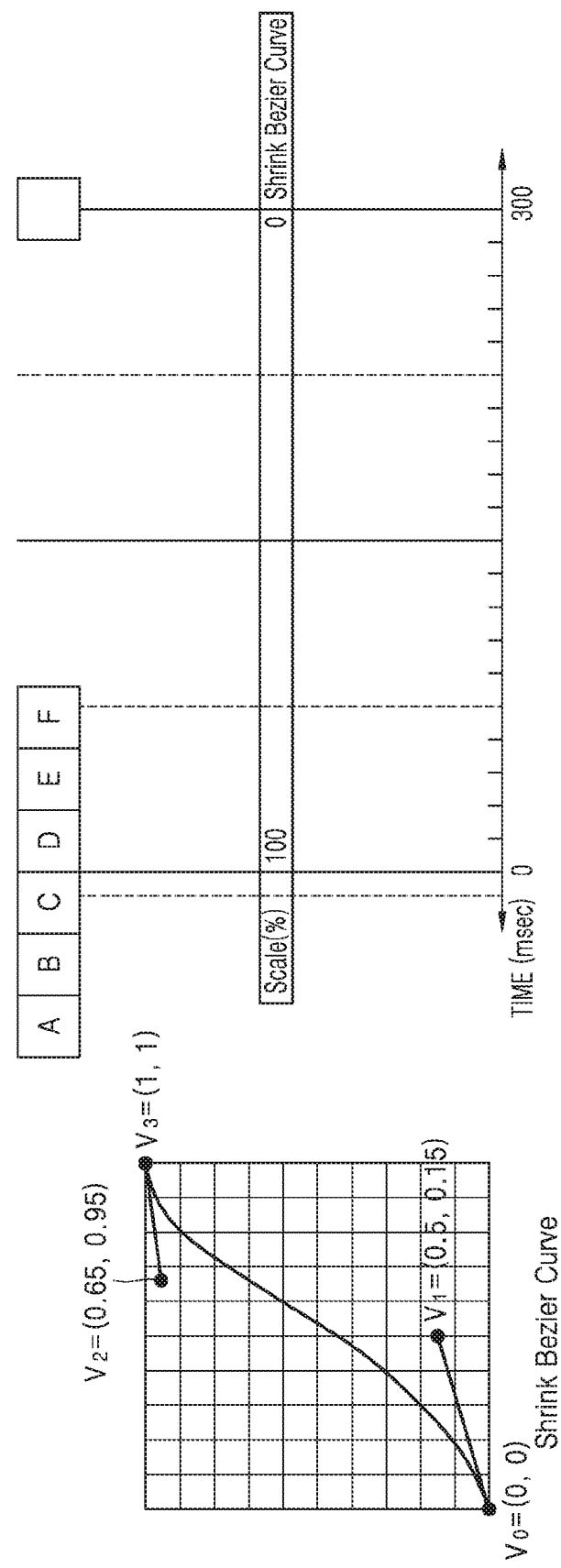
FIGS. 8A and 8B show a curve that may be used when sizes of items corresponding to an open item area are continuously changed according to an exemplary embodiment.

FIG. 8A shows a curve that may be used for a speed at which sizes of items corresponding to the open item area 620 are continuously changed according to an exemplary embodiment.

The curve of FIG. 8A is a Bézier curve. A Bézier curve is a parametric curve frequently used in computer graphics. The Bézier curve is used to obtain various free curves by moving a start point that is a first control point, an end point that is a last control point, and intermediate control points between the start point and the end point. For example, when there are four points $P_0$, $P_1$, $P_2$, and $P_3$, a curve starts at the point $P_0$ and arrives at the point $P_3$ where the curve's direction is controlled by point $P_1$ and the point $P_2$ without passing through the point $P_1$ or $P_2$.

Referring to FIG. 8A, the curve starts at a start point $V_0$ (0, 0) and arrives at an end point $V_3$ (1, 1). A slope of the curve that is obtained by a control point $V_1$ (0.5, 0.15) and a control point $V_2$ (0.65, 0.95) may be used as a speed at which sizes of items corresponding to the open item area 620 are continuously changed.

Referring to FIG. 8B, when sizes of items corresponding to the open item area 620 are continuously changed, a time taken to change an overall size of the items A 621, B 622, C 623, D 624, E 625, and F 626 corresponding to the open item area 620 to a size suitable for the closed item area 610 is, for example, 300 ms.

According to an exemplary embodiment, when the item list corresponding to the closed item area 610 is displayed on the open item area 620, the display apparatus 100 may continuously change sizes of items and output the size-changed items of the item list corresponding to the closed item area 610.

FIGS. 9A through 9D are reference diagrams for explaining a process of continuously changing sizes of items and outputting the size-changed items corresponding to the closed item area 610 according to an exemplary embodiment.

Figure 9A:
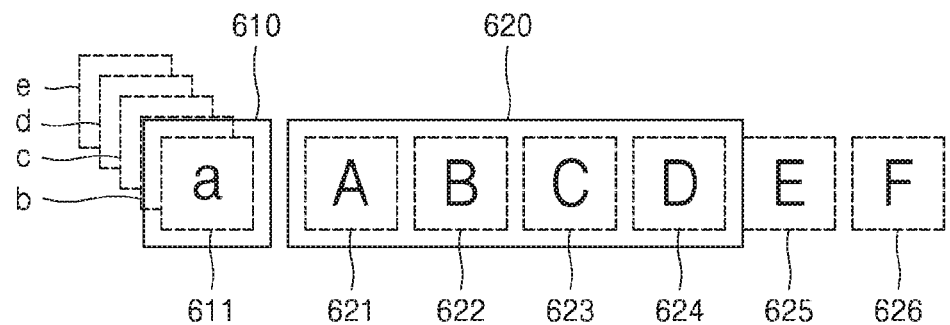
FIGS. 9A through 9D are diagrams for explaining a process of continuously changing sizes of items and outputting the size-changed items corresponding to a closed item area according to an exemplary embodiment.

Referring to FIG. 9A, the items a 611, b 612, c 613, d 614, and e 615 correspond to the closed item area 610, and only the item a 611 is displayed on the closed item area 610. The items A 621, B 622, C 623, and D 624 are displayed on the open item area 620, and the items E 625 and F 626 are not displayed on the open item area 620.

Figure 9B:
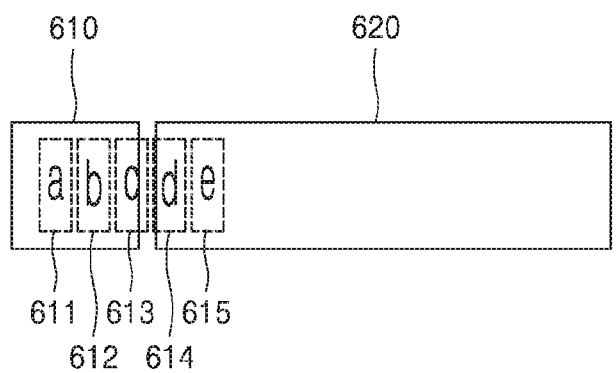
Figure 9C:
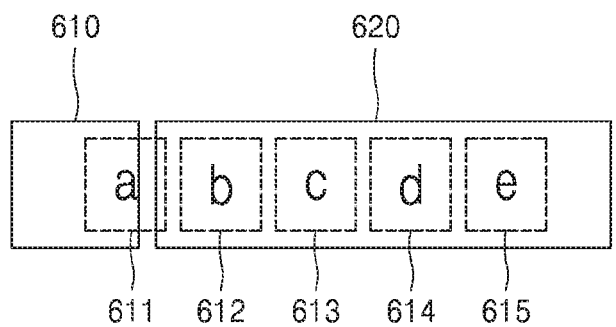
Figure 9D:
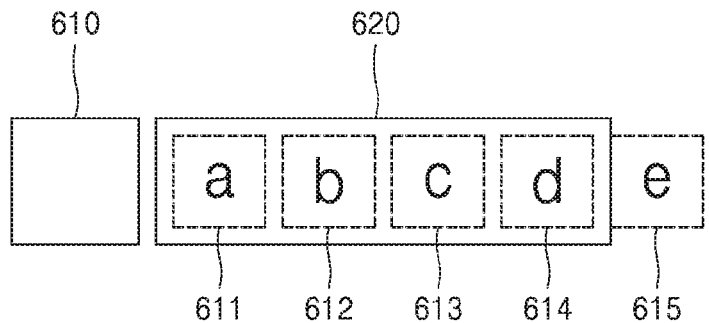

In FIG. 9A, in response to an input of the control apparatus 200 that selects the closed item area 610, the display apparatus 100 may continuously change sizes of items and output the size-changed items corresponding to the closed item area 610. Referring to FIGS. 9B through 9D, widths of the items a 611, b 612, c 613, d 614, and e 615 corresponding to the closed item area 610 are gradually increased and the size-changed items are output. As time passes, referring to FIG. 9C, widths of the items a 611, b 612, c 613, d 614, and e 615 are further increased. As time passes, referring to FIG. 9D, widths of the items a 611, b 612, c 613, d 614, and e 615 are further increased and the size-changed items are output.

In FIG. 9A, in response to an input of the control apparatus 200 that selects the closed item area 610, the display apparatus 100 may continuously change sizes of items corresponding to the closed item area 610, and thus the user may intuitively enjoy a process of displaying the item list corresponding to the closed item area 610 on the open item area 620.

Also, according to an exemplary embodiment, a speed at which sizes of items corresponding to the closed item area 610 are continuously changed may not be linear, and may have a specific curved shape.

Figures 10A, 10B:
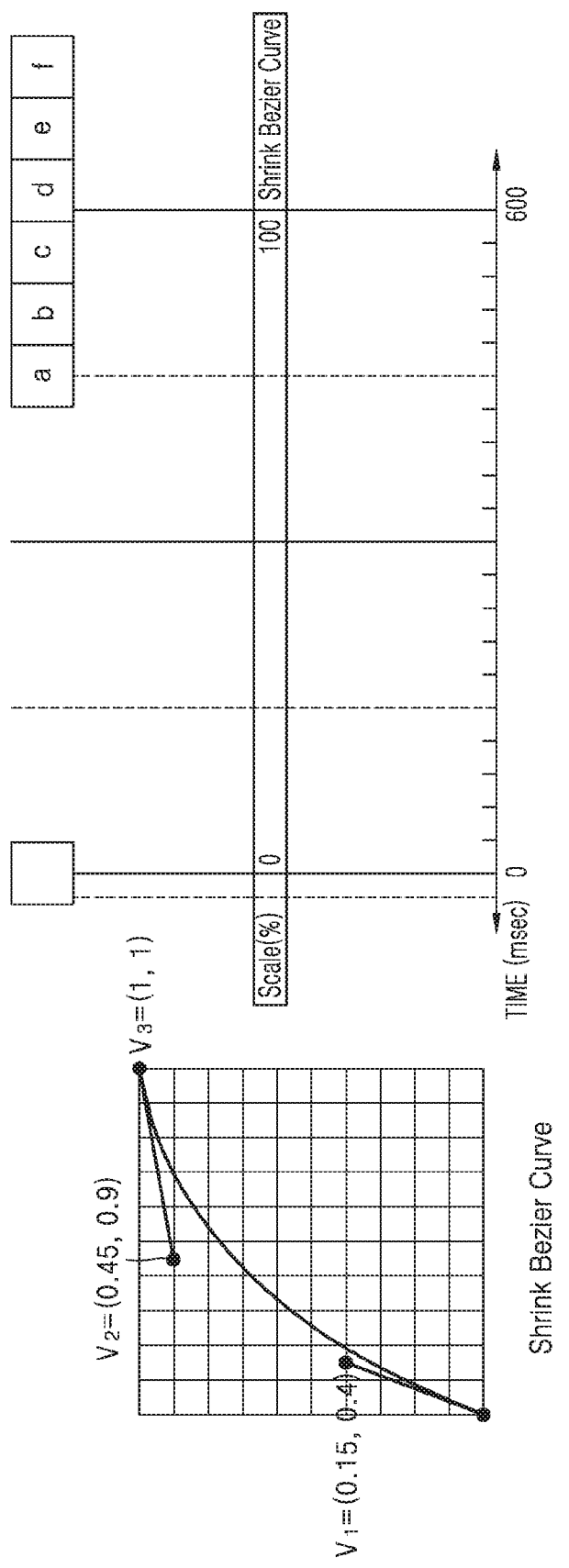
FIGS. 10A and 10B show a curve that may be used when sizes of items corresponding to a closed item area are continuously changed according to an exemplary embodiment.

FIG. 10A shows a curve that may be used for a speed at which sizes of items corresponding to the closed item area 610 are continuously changed according to an exemplary embodiment.

The curve of FIG. 10A is a Bézier curve. The curve starts at a start point $V_0$ (0, 0) and arrives at an end point $V_3$ (1, 1). A slope of the curve that is obtained by a control point $V_1$ (0.15, 0.4) and a control point $V_2$ (0.45, 0.9) may be used as a speed at which sizes of items corresponding to the open item area 620 are continuously changed.

Referring to FIG. 10B, since sizes of items corresponding to the closed item area 610 are continuously changed, a time taken to change a size corresponding to the closed item area 610 to an overall size of the items a 611, b 612, b 613, d 614, e 615, and f 616 corresponding to the open item area 620 is, for example, 600 ms.

According to an exemplary embodiment, when the item list corresponding to the closed item area 610 and the item list corresponding to the open item area 620 are swapped with each other, positions of the item lists that are displayed may be continuously changed.

FIGS. 11A through 11E are reference diagrams for explaining a process of swapping an item list corresponding to the closed item area 610 with an item list corresponding to the open item area 620 according to an exemplary embodiment.

Referring to FIG. 11A, an item list including the items a 611, b 612, c 613, d 614, and e 615 corresponds to the closed item area 610, and only the item a 611 is displayed on the closed item area 610. An item list including the items A 621, B 622, C 623, D 624, E 625, and F 626 corresponds to the open item area 620, and the items A 621, B 622, C 623, and D 624 are displayed on the open item area 620.

In FIG. 11A, in response to an input of the control apparatus 200 that selects the closed item area 610, the display apparatus 100 may continuously change sizes of items and output the size-changed items of the item list corresponding to the closed item area 610 and may continuously change sizes of items and output the size-changed items of the item list corresponding to the open item area 620. Also, the display apparatus 100 may gradually move rightward the items of the item list corresponding to the closed item area 610 so that the items of the item list corresponding to the closed item area 610 are arranged on the open item area 620, and may gradually move leftward the items of the item list corresponding to the open item area 620 so that the items of the item list corresponding to the open item area 620 are arranged on the closed item area 610.

Referring to FIG. 11B, the item list corresponding to the closed item area 610 is displayed more to the right than that in FIG. 11A, and the item list corresponding to the open item area 620 is displayed more to the left than that in FIG. 11A. In FIG. 11B, the item list including the items a 611, b 612, c 613, d 614, and e 615 are to be displayed over the entire open item area 620. However, since the item list including the items a 611, b 612, c 613, d 614, and e 615 may partially overlap the item list including the items A 621, B 622, C 623, D 624, E 625, and F 626, it may be difficult to distinguish the item list including the items a 611, b 612, c 613, d 614, and e 615 from the item list including the items A 621, B 622, C 623, D 624, E 625, and F 626. Accordingly, for convenience, the item list including the items a 611, b 612, c 613, d 614, and e 615 is displayed horizontally under the item list including the items A 621, B 622, C 623, D 624, E 625, and F 626. However, it will be understood by one of ordinary skill in the art that the item list including the items a 611, b 612, c 613, d 614, and e 615 is displayed at the same horizontal level as the item list including the items A 621, B 622, C 623, D 624, E 625, and F 626.

Also, referring to FIG. 11B, the items of the item list corresponding to the closed item area 610 are displayed to be different from those in FIG. 11A, and the items of the item list corresponding to the open item area 620 are displayed to have slightly smaller widths than those in FIG. 11A.

Referring to FIG. 11C, the item list corresponding to the closed item area 610 is displayed more to the right than that in FIG. 11B, and widths of the items a 611, b 612, c 613, d 614, and e 615 of the item list are slightly greater than those in FIG. 11B, and the item list including the items A 621, B 622, C 623, D 624, E 625, and F 626 corresponding to the open item area 620 is displayed more to the left than that in FIG. 11B, and widths of the items A 621, B 622, C 623, D 624, E 625, and F 626 of the item list are slightly less than those in FIG. 11B.

Referring to FIG. 11D, the item list corresponding to the closed item area 610 is displayed more to the right than that in FIG. 11C, and widths of the items a 611, b 612, c 613, d 614, and e 615 of the item list are slightly greater than those in FIG. 11C. The item list including the items A 621, B 622, C 623, D 624, E 625, and F 626 corresponding to the open item area 620 is displayed more to the left than that in FIG. 11C, and widths of the items A 621, B 622, C 623, D 624, E 625, and F 626 of the item list are slightly less than those in FIG. 11C.

Referring to FIG. 11E, the items a 611, b 612, c 613, d 614, and e 615 of the item list corresponding to the closed item area 610 are moved more to the right than those in FIG. 11D and are displayed on the open item area 620, and widths of the items a 611, b 612, c 613, d 614, and e 615 of the item list are greater than those in FIG. 11D. The items A 621, B 622, C 623, D 624, E 625, and F 626 of the item list corresponding to the open item area 620 are moved more to the left than those in FIG. 11D and are displayed on the closed item area 610 and only the item A 621 of the item list is displayed on the closed item area 610.

As shown from an original state of FIG. 11A to a state of FIG. 11E, a process of swapping the item list including the items a 611, b 612, c 613, d 614, and e 615 with the item list including the items A 621, B 622, C 623, D 624, E 625, and F 626 is explained only at four points of time for convenience of explanation. However, actually, the item list including the items a 611, b 612, c 613, d 614, and e 615 may be continuously displayed on the display 115 while being continuously moved from a position of FIG. 11A to a position of FIG. 11-2e. Also, the item list including the items A 621, B 622, C 623, D 624, E 625, and F 626 may be continuously displayed on the display 115 while being continuously moved from a position of FIG. 11A to a position of FIG. 11E.

Also, according to an exemplary embodiment, a speed at which positions of the item list corresponding to the closed item area 610 and the item list corresponding to the open item area 620 are continuously changed may not be linear, and may have a specific curved shape.

FIG. 12A shows a curve that may be used to determine a speed at which positions of an item list corresponding to the closed item area 610 and an item list corresponding to the open item area 620 are continuously changed according to an exemplary embodiment.

The curve of FIG. 12A is a Bézier curve. The curve starts at a start point $V_0$ (0, 0) and arrives at an end point $V_3$ (1, 1). A slope of the curve that is obtained by a control point $V_1$ (0.6, 0.1) and a control point $V_2$ (0.9, 0.5) may be used as a speed at which the item list corresponding to the open item area 620 is moved or a speed at which the item list corresponding to the closed item area 610 is moved.

According to an exemplary embodiment, a speed at which the item list corresponding to the closed item area 610 is continuously moved may be set to be the same as a speed at which the item list corresponding to the open item area 620 is continuously moved.

According to an exemplary embodiment, a speed at which the item list corresponding to the closed item area 610 is continuously moved may be set to be different from a speed at which the item list corresponding to the open item area 620 is continuously moved.

For example, a time taken to continuously move the item list corresponding to the closed item area 610 may be different from a time taken to continuously move the item list corresponding to the open item area 620.

Referring to FIG. 12B, when a time taken for an item list A to be moved from a position m of the closed item area 610 to a position n of the open item area 620 is 400 msec and a time taken for an item list B to be moved from the position n of the open item area 620 to the position m of the closed item area 610 is 600 msec, in order to finally swap the item list A with the item list B, for example, the item list B may be moved first, and 200 msec later, the item list A may be moved.

Figure 13:
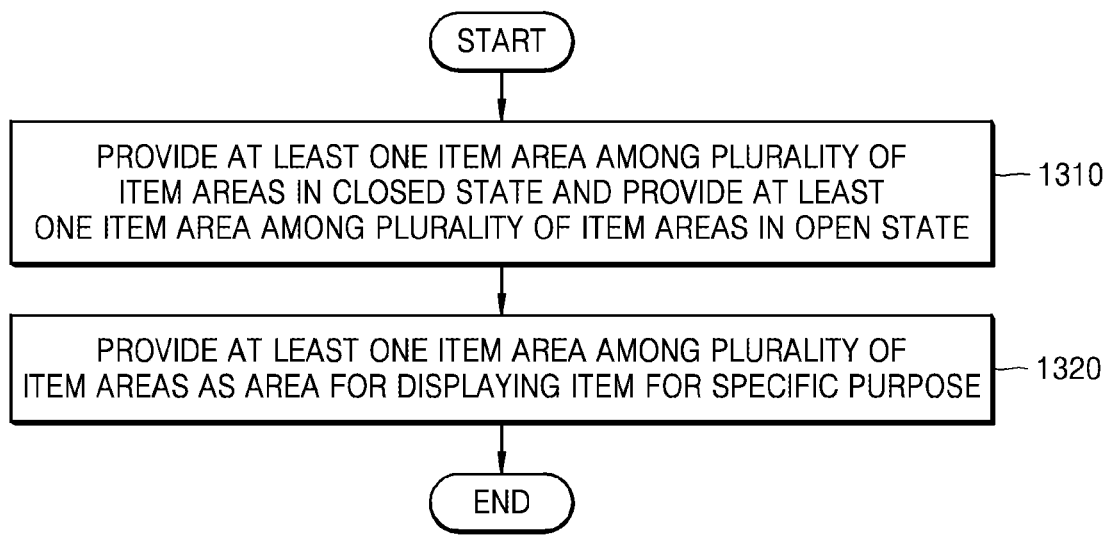
FIG. 13 is a flowchart for explaining an operation performed by the display apparatus to use one of a plurality of item areas as an area for displaying an item for a specific purpose according to an exemplary embodiment.

FIG. 13 is a flowchart for explaining an operation performed by the display apparatus 100 to use one of a plurality of item areas as an area for displaying an item for a specific purpose according to an exemplary embodiment.

Referring to FIG. 13, in operation 1310, the display apparatus 100 provides at least one item area among a plurality of item areas as a closed item area and at least one item area among the plurality of item areas as an open item area.

In operation 1320, the display apparatus 100 provides at least one item area among the plurality of item areas as an area for displaying an item for a specific purpose.

According to an exemplary embodiment, the specific purpose may include a specific purpose that is desired by a manufacturer of the display apparatus 100.

According to an exemplary embodiment, the specific purpose may include a specific purpose that is desired by a service provider.

According to an exemplary embodiment, the specific purpose may include a specific purpose that is desired by the user.

According to an exemplary embodiment, the specific purpose may include an advertisement purpose.

The specific purpose may be set to any of various purposes, but the following will be explained for convenience on the assumption that the specific purpose is an advertisement purpose.

Figure 14A:
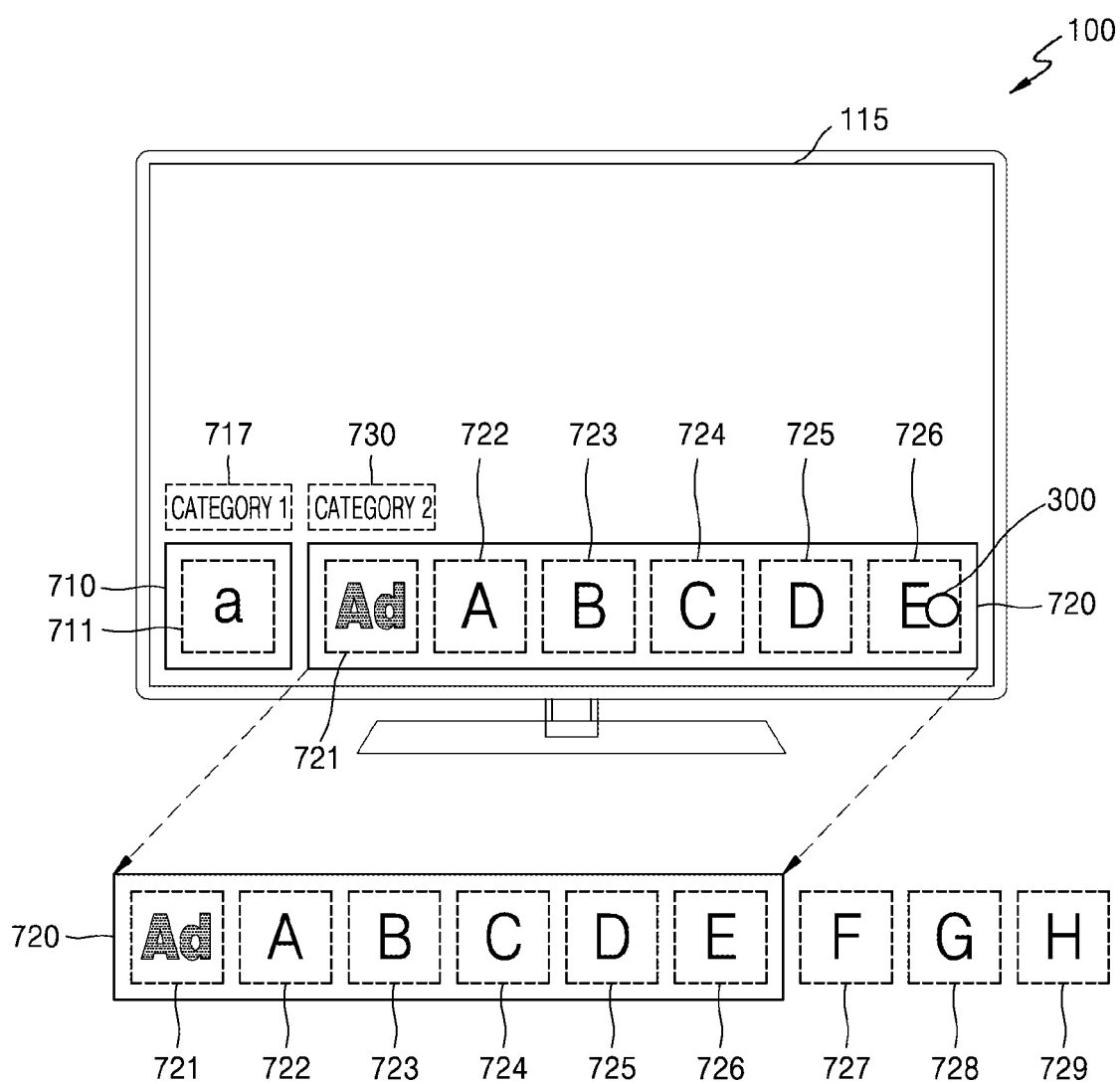
FIGS. 14A and 14B are diagrams of the display apparatus that arranges and displays an advertisement item at a first position of an item list corresponding to an open item area according to an exemplary embodiment.
Figure 14B:
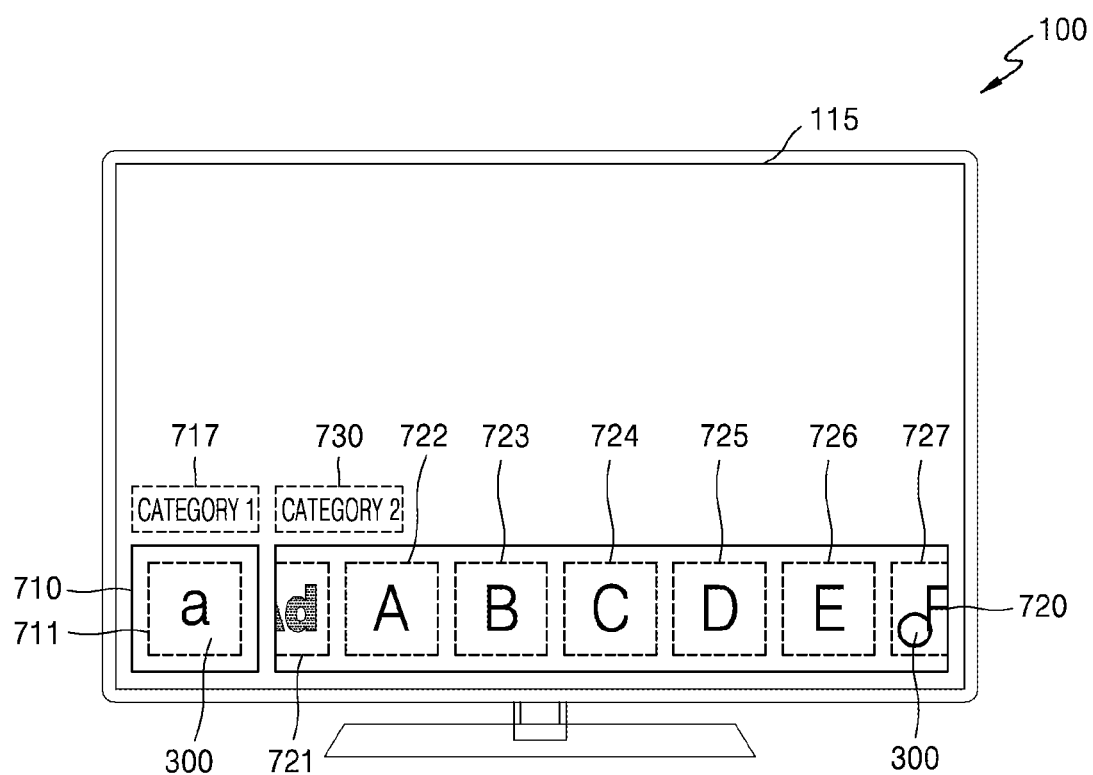

FIGS. 14A and 14B are views of the display apparatus 100 that arranges and displays an advertisement item at a first position of an item list corresponding to an open item area according to an exemplary embodiment.

Referring to FIG. 14A, the display apparatus 100 provides a closed item area 710 and an open item area 720.

An item list of a category 1 717 corresponds to the closed item area 710, and an item a 711 of the item list is displayed on the closed item area 710.

An item list corresponding to a category 2 730 may be displayed on the open item area 720. The item list includes an advertisement item 721 and items A 722, B 723, C 724, D 725, E 726, F 727, G 728, and H 729, and the advertisement item 721 and the items A 722, B 723, C 724, D 725, and E 726 are displayed on the open item area 720.

The advertisement item 721 may not have an attribute that is common to the other items included in the category 2, and may be provided to be displayed at a first position or another fixed position of the open item area 720 to provide service. Accordingly, when the user's input that selects the closed item area 710 is input, the display apparatus 100 may display the item list corresponding to the category 1 on the open item area 720. Even in this case, the display apparatus 100 may remain displaying the advertisement item 721 at a first position among items displayed on the open item area 720.

Referring to FIG. 14B, due to the user's input that scrolls on a right end of the open item area 720, the advertisement item 721 that is at the first position of the item list may be partially covered and the item F 727 that is arranged on the right of the item E 726 in the item list may be partially displayed on the open item area 720.

As such, since the advertisement item 721 is arranged as an item for a specific purpose at the first position of the item list corresponding to the open item area 720, the advertisement item 721 may be moved along with other items of the item list corresponding to the open item area 720 due to scrolling of the open item area 720.

According to an exemplary embodiment, when the advertisement item 721 is entirely displayed on the open item area 720, in response to an input of the control apparatus 200 that selects the closed item area 710, the display apparatus 100 may continuously change sizes of items of the item list corresponding to the open item area 720 but still maintain a size of the advertisement item 721.

FIGS. 15A through 15E are reference diagrams for explaining a method of swapping an item list corresponding to the open item area 720 with an item list corresponding to the closed item area 710 when the advertisement item 721 is entirely displayed on the open item area 720 according to an exemplary embodiment.

Figure 15A:
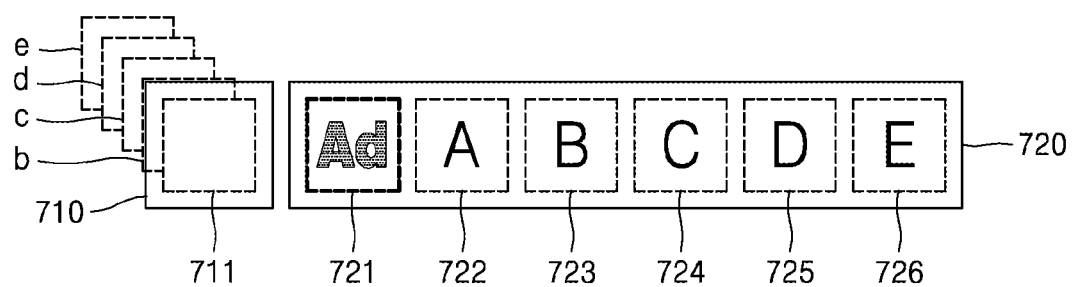
FIGS. 15A through 15E are diagrams for explaining a method of swapping an item list corresponding to an open item area with an item list corresponding to a closed item area when the advertisement item is entirely displayed on the open item area according to an exemplary embodiment.

Referring to FIG. 15A, an item list including items a 711, b 712, c 713, d 714, and e 715 corresponds to the closed item area 710, and only the item a 711 is displayed on the closed item area 710. An item list including the advertisement item 721 and the items A 722, B 723, C 724, D 725, E 726, F 727, and G 728 corresponds to the open item area 720, and the advertisement item 721 and the items A 722, B 723, C 724, D 725, and E 726 are displayed on the open item area 720.

In FIG. 15A, in response to an input of the control apparatus 200 that selects the closed item area 710, the display apparatus 100 may continuously change sizes of the items a 711, b 712, c 713, d 714, and e 715 and output the size-changed items a 711, b 712, c 713, d 714, and e 715 of the item list corresponding to the closed item area 710 and may continuously change sizes of the items A 722, B 723, C 724, D 725, E 726, F 727, and G 728 and output the size-changed items A 722, B 723, C 724, D 725, E 726, F 727, and G 728 of the item list corresponding to the open item area 720, and also may gradually move rightward the items a 711, b 712, c 713, d 714, and e 715 of the item list corresponding to the closed item area 710 so that the items a 711, b 712, c 713, d 714, and e 715 are arranged on the open item area 720 and may gradually move leftward the items A 722, B 723, C 724, D 725, E 726, F 727, and G 728 of the item list corresponding to the open item area 720 so that the items A 722, B 723, C 724, D 725, E 726, F 727, and G 728 are arranged on the closed item area 710. However, during the aforementioned procedure, the size of the advertisement item 721 may remain the same and only the sizes of the other items may be continuously changed.

Figure 15B:
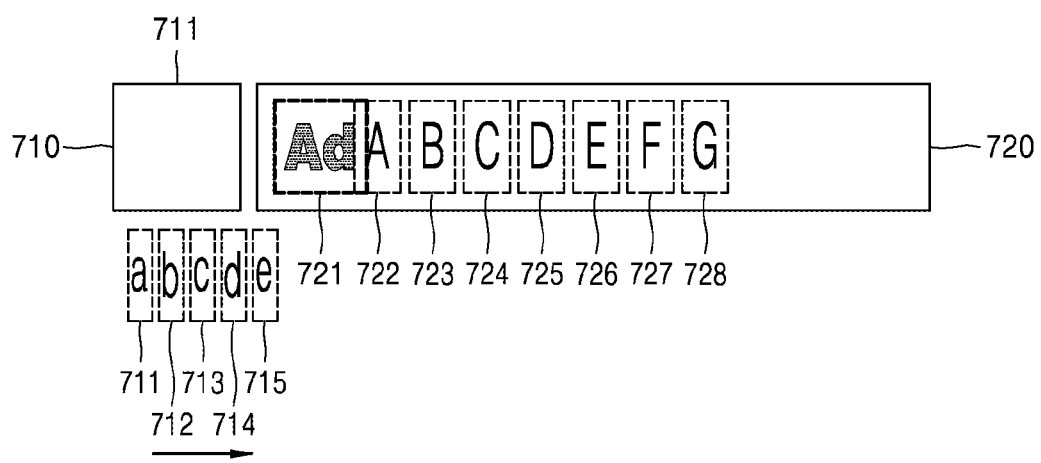

Referring to FIG. 15B, the item list including the items a 711, b 712, c 713, d 714, and e 715 corresponding to the closed item area 710 is displayed more to the right than that in FIG. 15A, and the item list including A 722, B 723, C 724, D 725, E 726, F 727, and G 728 corresponding to the open item area 720 is displayed more to the left than that in FIG. 15A, without changing a position or a size of the advertisement item 721. The item list including the items a 711, b 712, c 713, d 714, and e 715 is to be displayed over the entire closed item area 710 in FIG. 15B. However, since the item list including the items a 711, b 712, c 713, d 714, and e 715 may partially overlap the item list including the items A 722, B 723, C 724, D 725, E 726, F 727, and G 728, it may be difficult to distinguish the item list including the items a 711, b 712, c 713, d 714, and e 715 from the item list including the items A 722, B 723, C 724, D 725, E 726, F 727, and G 728. Although the item list including the items a 711, b 712, c 713, d 714, and e 715 is displayed horizontally under the item list including the items A 722, B 723, C 724, D 725, E 726, F 727, and G 728 for convenience of explanation, it will be understood by one of ordinary skill in the art that actually, the item list including the items a 711, b 712, c 713, d 714, and e 715 is displayed at the same horizontal level as the item list including the items A 722, B 723, C 724, D 725, E 726, F 727, and G 728.

Also, referring to FIG. 15B, the items a 711, b 712, c 713, d 714, and e 715 of the item list corresponding to the closed item area 710 are displayed, and the items A 722, B 723, C 724, D 725, E 726, F 727, and G 728 of the item list corresponding to the open item area 720 are displayed to have widths slightly less than those in FIG. 15A.

Figure 15C:
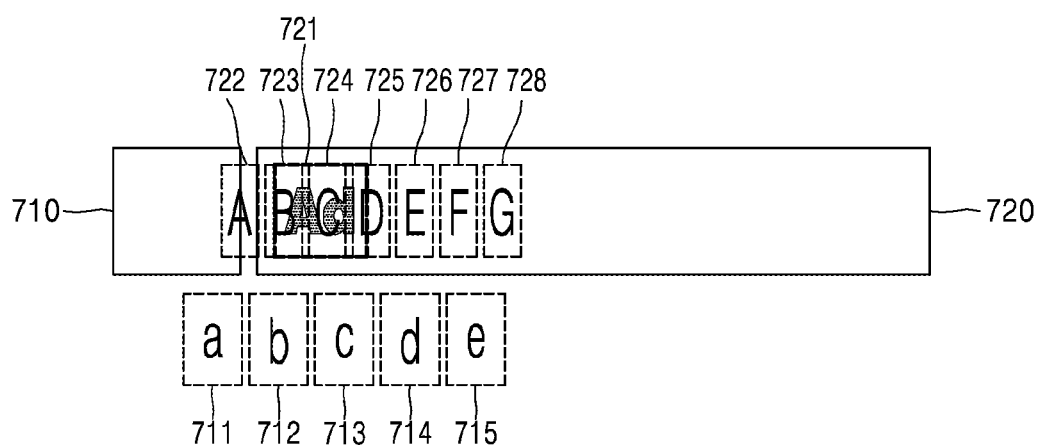

Referring to FIG. 15C, the item list including the items a 711, b 712, c 713, d 714, and e 715 corresponding to the closed item area 710 is displayed more to the right than that in FIG. 15B and widths of the items a 711, b 712, c 713, d 714, and e 715 of the item list are slightly greater than those in FIG. 15B, the item list including the items A 722, B 723, C 724, D 725, E 726, F 727, and G 728 corresponding to the open item area 720 is displayed more to the left than that in FIG. 15B and widths of the items A 722, B 723, C 724, D 725, E 726, F 727, and G 728 of the item list are slightly less than those in FIG. 15B.

Figure 15D:
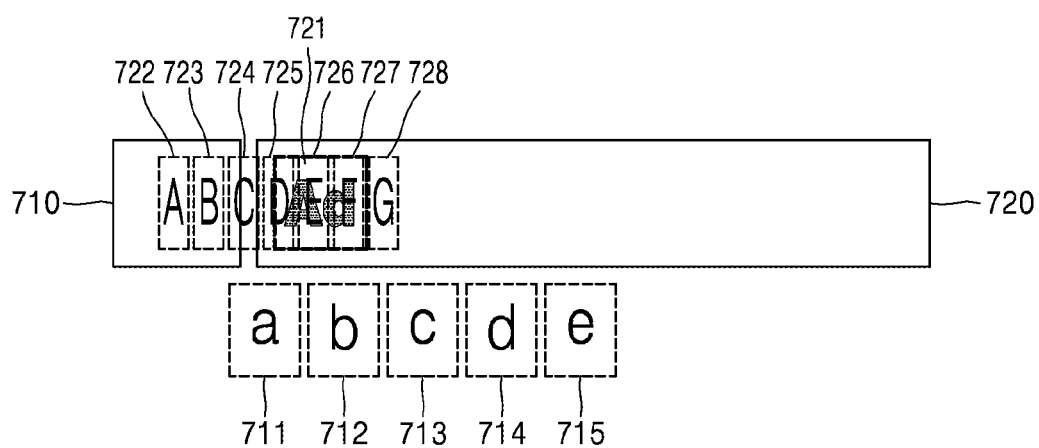

Referring to FIG. 15D, the item list including the items a 711, b 712, c 713, d 714, and e 715 corresponding to the closed item area 710 is displayed more to the right than that in FIG. 15C and widths of the items a 711, b 712, c 713, d 714, and e 715 of the item list are slightly greater than those in FIG. 15C, the item list including the items A 722, B 723, C 724, D 725, E 726, F 727, and G 728 corresponding to the open item area 720 is displayed more to the left than that in FIG. 15C and widths of the items A 722, B 723, C 724, D 725, E 726, F 727, and G 728 of the item list are slightly less than those in FIG. 15C. Even in this case, a position and a size of the advertisement item 721 are not changed.

Figure 15E:
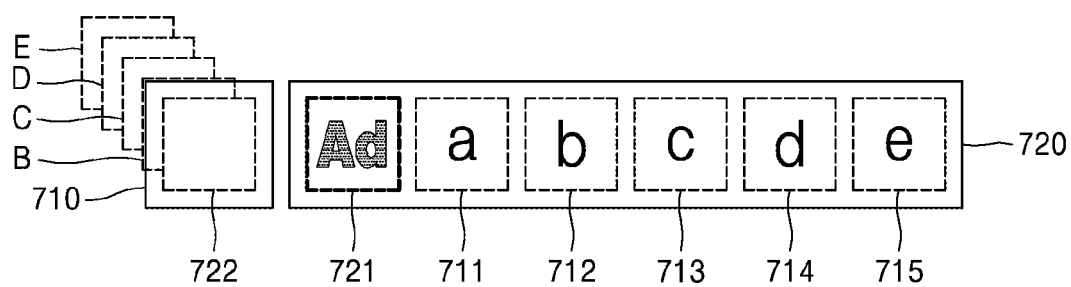

Referring to FIG. 15E, the items a 711, b 712, c 713, d 714, and e 715 of the item list corresponding to the closed item area 710 are moved more to the right than those in FIG. 15D and are displayed on the open item area 720 to be disposed next to the advertisement item 721, and widths of the items a 711, b 712, c 713, d 714, and e 715 of the item list are greater than those in FIG. 15D. The items A 722, B 723, C 724, D 725, E 726, F 727, and G 728 of the item list corresponding to the open item area 720 are arranged on the closed item area 710 and only the item A 721 of the item list is displayed on the closed item area 710 as a representative. Even in this case, a position and a size of the advertisement item 721 are not changed.

As shown from an original state of FIG. 15A to a state of FIG. 15E, a process of swapping the item list including the items a 711, b 712, c 713, d 714, and e 715 with the item list including the items A 722, B 723, C 724, D 725, E 726, F 727, and G 728 is explained only at four points of time for convenience of explanation. However, actually, the item list including the items a 711, b 712, c 713, d 714, and e 715 may be continuously displayed on the display 115 while being continuously moved from a position of FIG. 15A to a position of FIG. 15E. Also, the item list including the items A 722, B 723, C 724, D 725, E 726, F 727, and G 728 may be continuously displayed on the display 115 while being continuously moved from a position of FIG. 15A to a position of FIG. 15E.

According to an exemplary embodiment, when the advertisement item 721 is partially displayed on the open item area 720, in response to an input of the control apparatus 200 that selects the closed item area 710, the display apparatus 100 may continuously change sizes of items of the item list corresponding to the open item area 720, including the advertisement item 721.

Figure 16A:
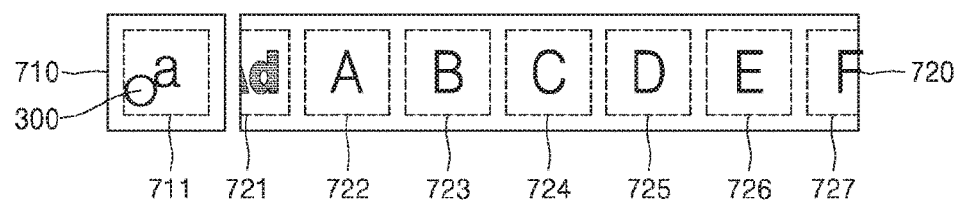
FIGS. 16A through 16C are diagrams for explaining a method of swapping an item list corresponding to the open item area with an item list corresponding to the closed item area when the advertisement item is partially displayed on the open item area according to an exemplary embodiment.
Figure 16B:
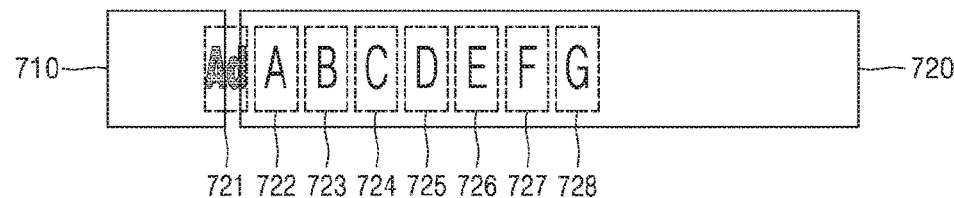
Figure 16C:
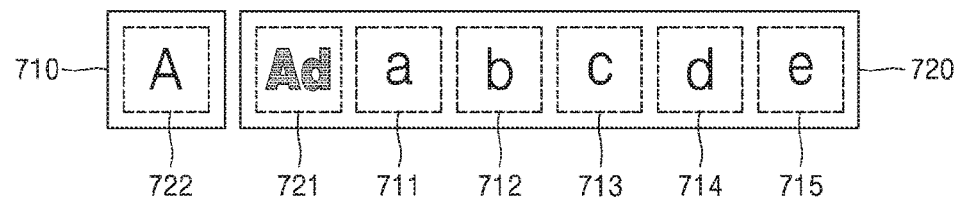

FIGS. 16A through 16C are reference diagrams for explaining a method of swapping an item list corresponding to the open item area 720 with an item list corresponding to the closed item area 710 when the advertisement item 721 is partially displayed on the open item area 720 according to an exemplary embodiment.

Although FIG. 16A shows the same configuration as that of FIG. 15A, a part of the advertisement item 721 is covered and only a part of the advertisement item 721 is displayed on the open item area 720 due to rightward scrolling on the open item area 720.

As such, in response to an input of the control apparatus 200 that selects the closed item area 710 when only a part of the advertisement item 721 is displayed, when an item list corresponding to the open item area 720 and an item list corresponding to the closed item area 710 are swapped with each other, sizes of items of the item list corresponding to the closed item area 710 including the advertisement item 721 may be continuously changed and displayed.

Referring to FIG. 16B, widths of the advertisement item 721 and the items A 722, B 723, C 724, D 725, E 726, F 727, and G 728 of the item list corresponding to the open item area 720 are reduced and the items A 722, B 723, C 724, D 725, E 726, F 727, and G 728 of the item list are moved and displayed more to the left.

Referring to FIG. 16C, when the item list including the items A 722, B 723, C 724, D 725, E 726, F 727, and G 728 corresponding to the open item area 720 is completely swapped with the item list including the items a 711, b 712, c 713, d 714, and e 715 corresponding to the closed item area 710, the advertisement item 721 may be displayed at a first position of the open item area 720.

Figure 17A:
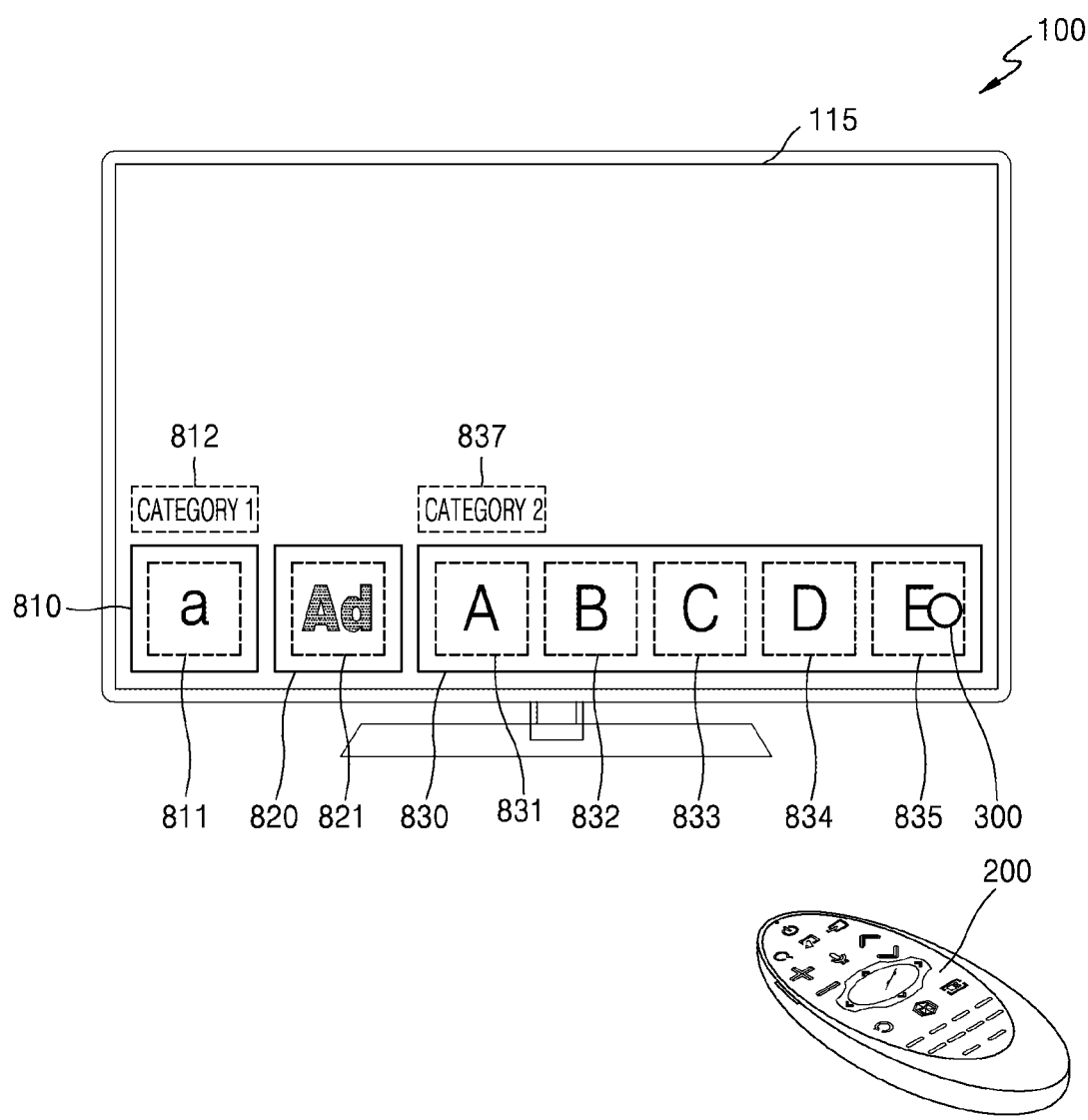
FIGS. 17A through 17C are diagrams of the display apparatus that uses one of a plurality of item areas as an area for displaying an item for a specific purpose according to an exemplary embodiment.
Figure 17B:
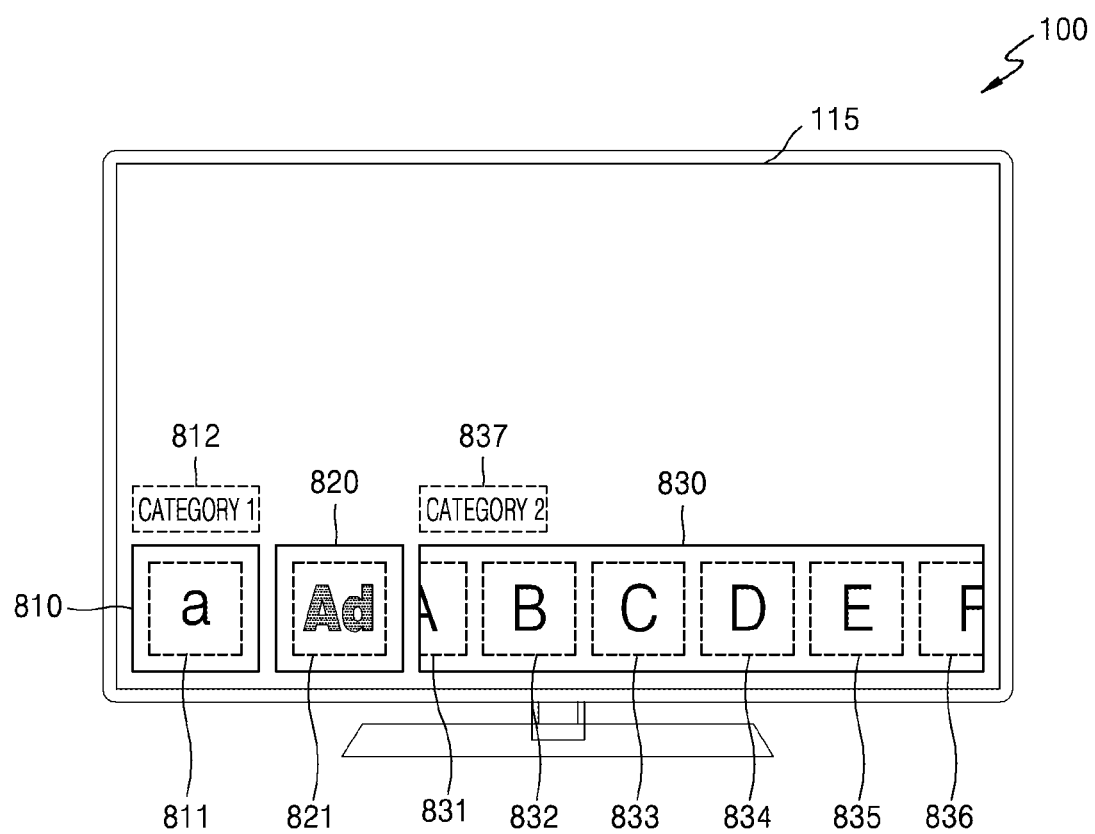
Figure 17C:
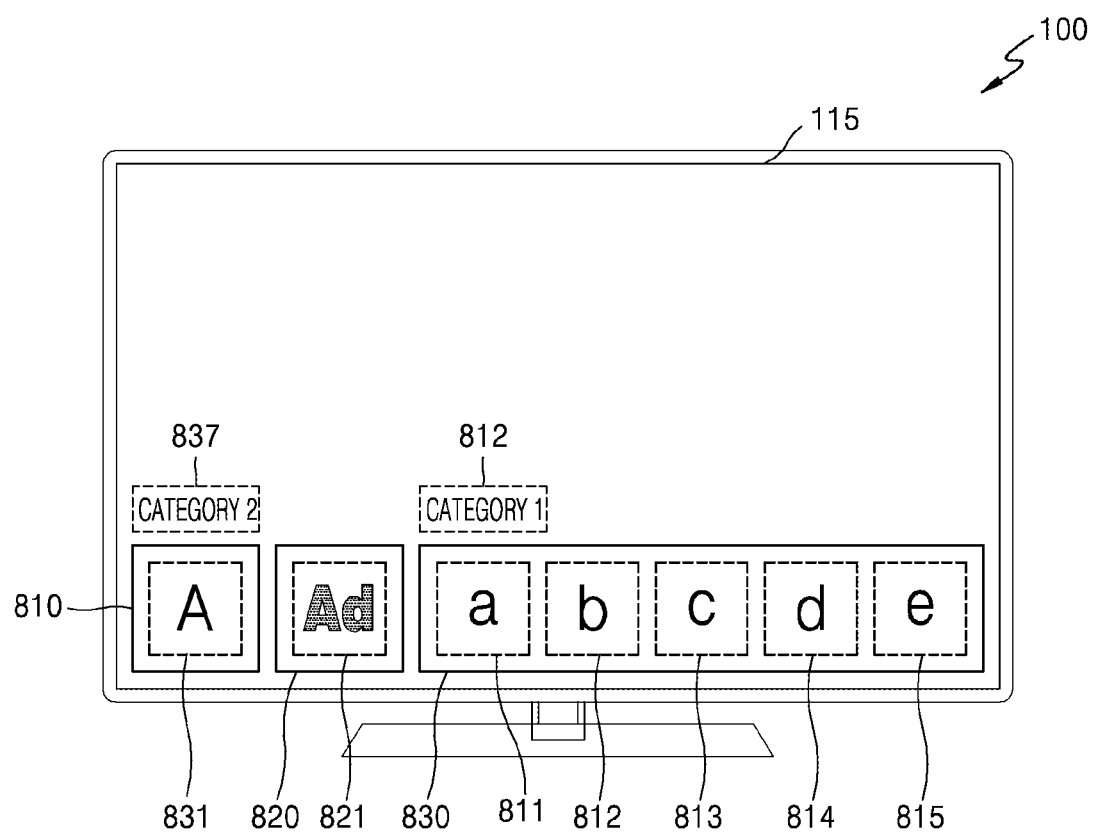

FIGS. 17A through 17C are diagrams of the display apparatus 100 that uses one of a plurality of item areas as an area for displaying an item for a specific purpose according to an exemplary embodiment.

An item list corresponding to a category 1 812 may be displayed on a closed item area 810, and an item a 811 of the item list is displayed on the closed item area 810.

Items A 831, B 832, C 833, D 834, and E 835 that are some items of an item list corresponding to a category 2 837 are displayed on an open item area 830.

Also, the display apparatus 100 provides an item area 820 for a specific purpose. According to an exemplary embodiment, an advertisement item 821 may be displayed on the item area 820.

Referring to FIG. 17B, due to the user's operation to scroll at a right end of the open item area 830, the item A 831 that is at a first position of the item list may be partially covered and the item F 836 that is on the right of the item E 835 in the item list may be partially displayed on the open item area 830.

In this case, since the item area 820 for a specific purpose is an item area that is independent from the open item area 830, the advertisement item 821 that is displayed is not affected by scrolling on the open item area 830. Accordingly, even when scrolling on the open item area 830 occurs, an overall shape of the advertisement item 821 may be maintained and displayed.

In FIG. 17B, in response to an input of the control apparatus 200 that selects the closed item area 810, the display apparatus 100 swaps the item list corresponding to the closed item area 810 with the item list corresponding to the open item area 830. In this case, since the item area 820 for a specific purpose, especially, for an advertisement purpose, is an area that is independent from the closed item area 810 or the open item area 830, the item area 820 is not affected by the swapping.

Referring to FIG. 17C, due to swapping between the item list corresponding to the closed item area 810 with the item list corresponding to the open item area 830 in response to an input of the control apparatus 200 that selects the closed item area 810 in FIG. 17B, the item A 831 is displayed on the closed item area 810, and items a 811, b 812, c 813, d 814, and e 815 that are items of the item list corresponding to the category 1 812 are displayed on the open item area 830.

Figure 18:
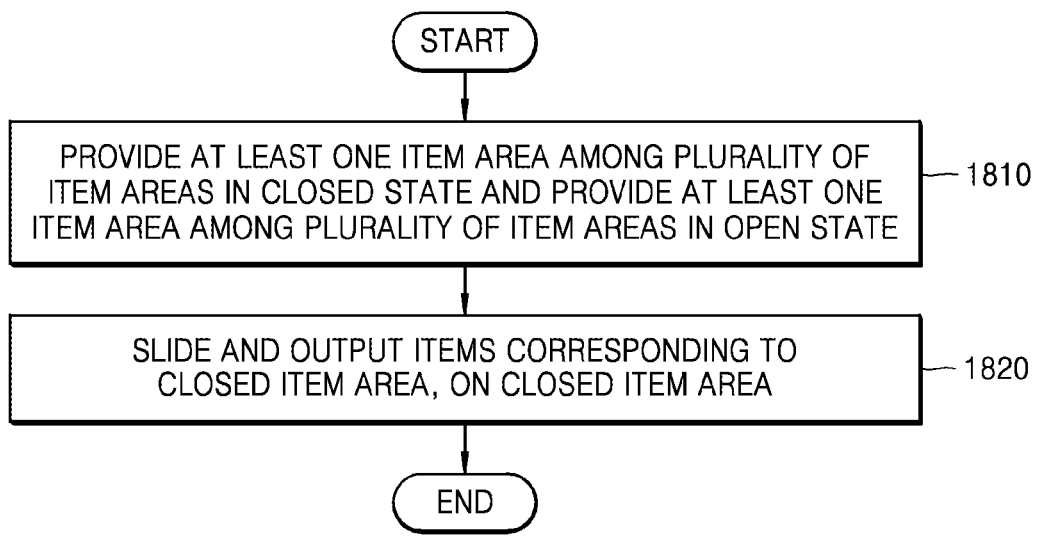
FIG. 18 is a flowchart for explaining an operation performed by the display apparatus to scroll and output items corresponding to a closed item area according to an exemplary embodiment.

FIG. 18 is a flowchart for explaining an operation of the display apparatus 100 to slide and output items corresponding to a closed item area according to an exemplary embodiment.

Referring to FIG. 18, in operation 1810, the display apparatus 100 provides at least one item area among a plurality of item areas as a closed item area and provides at least one item area among the plurality of item areas as an open item area.

In operation 1820, the display apparatus 100 slides and displays items of an item list corresponding to the closed item area, on the closed item area.

Figure 19:
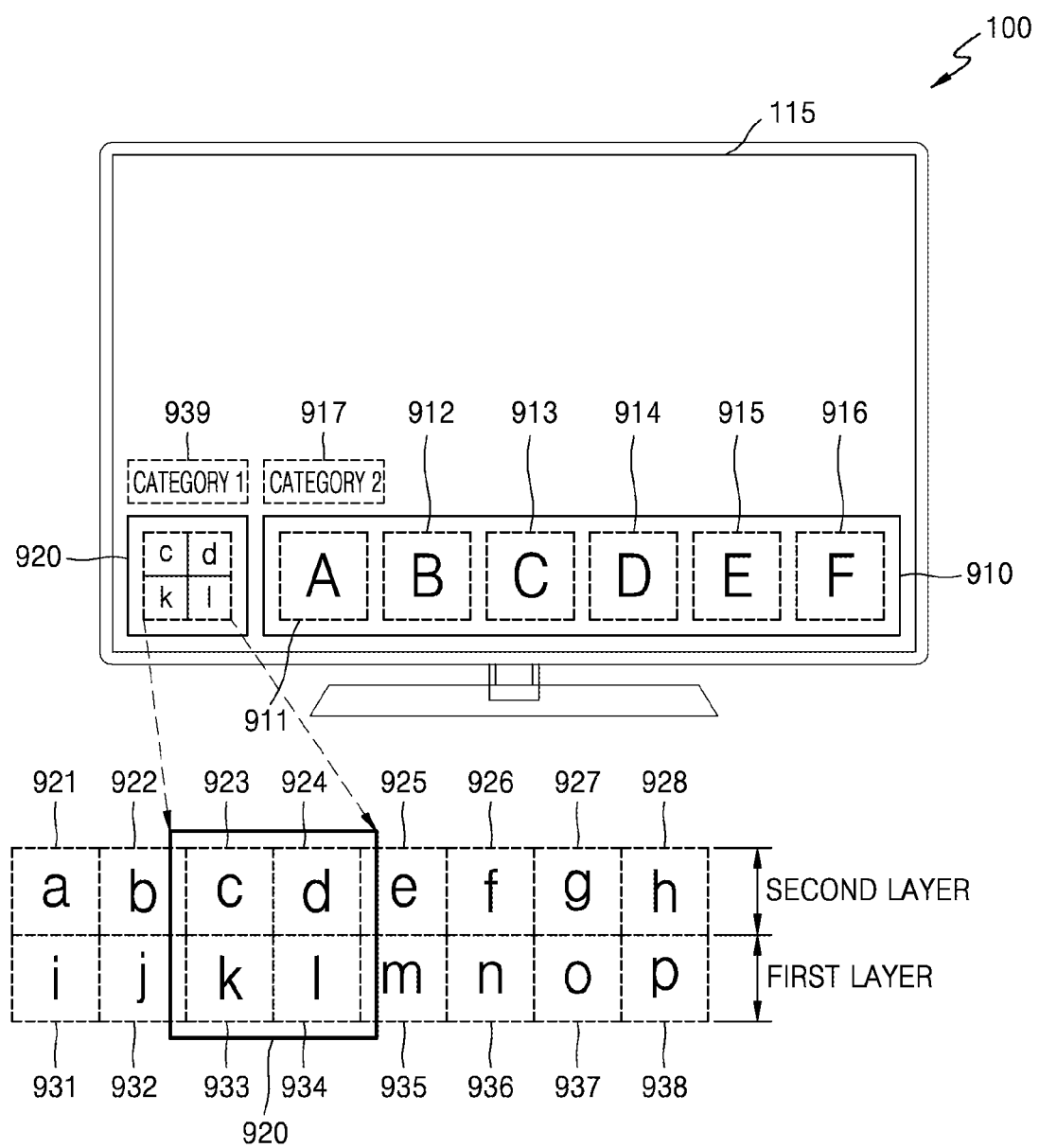
FIG. 19 is a diagram of the display apparatus that scrolls and outputs items on a closed item area according to an exemplary embodiment.

FIG. 19 is a diagram of the display apparatus 100 that slides and outputs items on a closed item area according to an exemplary embodiment.

Referring to FIG. 19, the display apparatus 100 provides an open item area 910 and a closed item area 920 to the display 115.

The open item area 910 may display an item list corresponding to a category 2 917, and items A 911, B 912, C 913, D 914, E 915, and F 916 of the item list may be displayed on the open item area 910.

The closed item area 920 may display an item list corresponding to a category 1 939. The item list corresponding to the category 1 939 includes items a-h 921-928 and items i-p 931-938.

According to an exemplary embodiment, one item in the item list corresponding to the category 1 939 may be displayed as an image on the closed item area 920.

According to an exemplary embodiment, one item in the item list corresponding to the category 1 may be displayed as an image on the closed item area 920 and images of items included in the item list may be slid and displayed.

According to an exemplary embodiment, a plurality of items in the item list corresponding to the category 1 may be displayed as small images on the closed item area 920.

According to an exemplary embodiment, a plurality of items in the item list corresponding to the category 1 may be displayed as small images on the closed item area 920 and the small images may be slid and output.

According to an exemplary embodiment, the closed item area 920 may be divided into a plurality of layers, and items of the item list corresponding to at least one layer of the plurality of layers may be slid and displayed.

Referring to FIG. 19, the closed item area 920 is divided into a first layer and a second layer, and items of the item list corresponding to the category 1 are allocated to the first and second layers. The items i through p 931 through 938 are displayed on the first layer and the items a through h 921 through 928 are displayed on the second layer. In this case, the items may be slid in various ways on the first layer and the second layer of the closed item area 920.

FIGS. 20A through 20E are diagrams for explaining a method of sliding and outputting items on a closed item area according to exemplary embodiments.

Figure 20A:
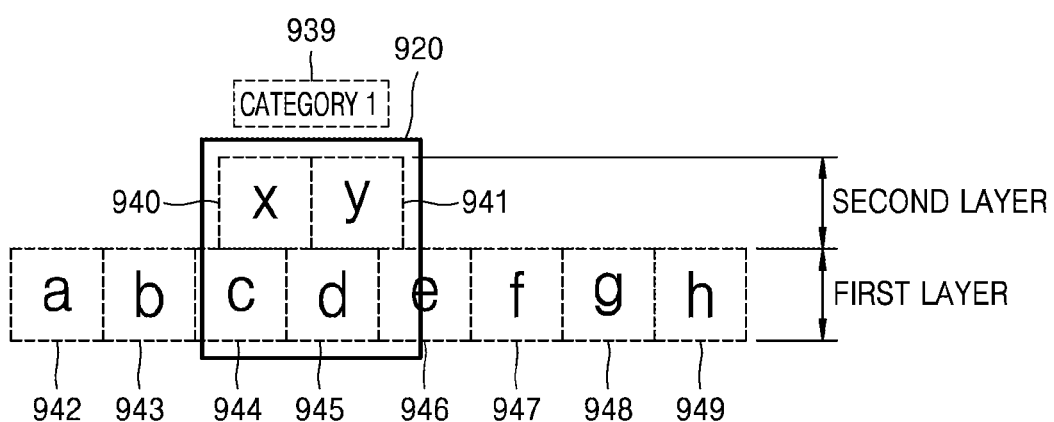
FIGS. 20A through 20E are diagrams for explaining a method of scrolling and outputting items on a closed item area according to exemplary embodiments.

FIG. 20A illustrates an example where items that are displayed on a second layer of a closed item area are fixed and items that are displayed on a first layer of the closed item area are slid and output.

Referring to FIG. 20A, an item list corresponding to a category 1 939 may be displayed on the closed item area 920. The item list includes items x 940, y 941, a 942, b 943, c 944, d 945, e 946, f 947, g 948, and h 949. Small images of the items x 940 and y 941 may be fixed on a second layer of the closed item area 920 and small images of the items a 942, b 943, c 944, d 945, e 946, f 947, g 948, and h 949 may be slid and output on a first layer of the closed item area 920.

Figure 20B:
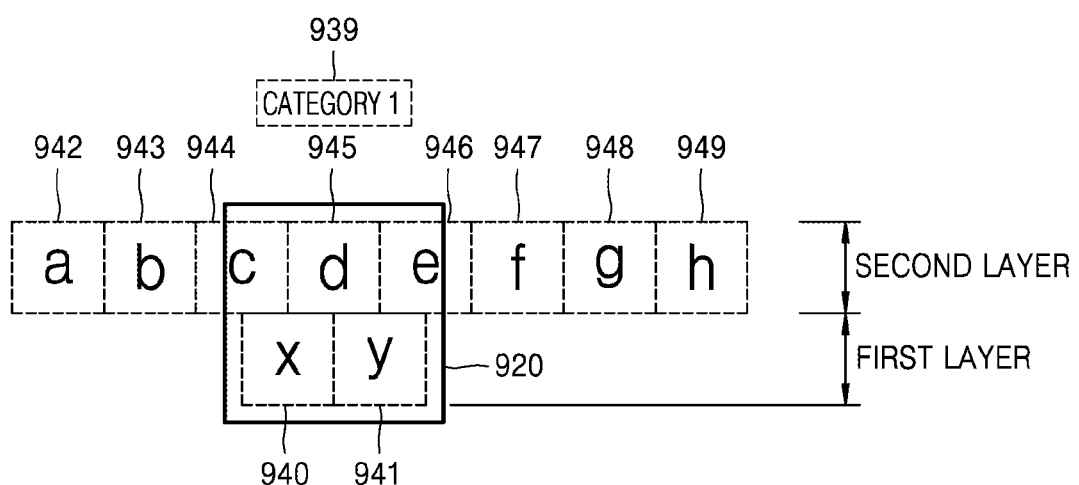

FIG. 20B illustrates an example where items that are displayed on a first layer of a closed item area are fixed and items that are displayed on a second layer of the closed item area are slid and output.

Referring to FIG. 20B, an item list corresponding to the category 1 may be displayed on the closed item area 920. The item list includes the items x 940, y 941, a 942, b 943, c 944, d 945, e 946, f 947, g 948, and h 949. Small images of the items x 940 and y 941 may be fixed and displayed on a first layer of the closed item area 920 and small images of the items a 942, b 943, c 944, d 945, e 946, f 947, g 948, and h 949 may be slid and output on a second layer of the closed item area 920.

Figure 20C:
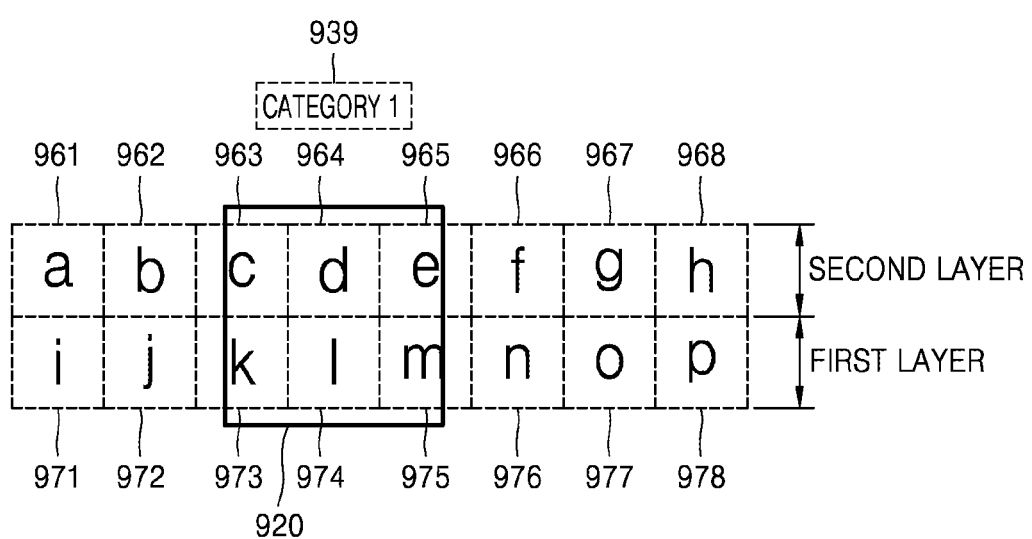

FIG. 20C illustrates an example where items are slid and output at the same speed on a first layer and a second layer of a closed item area.

Referring to FIG. 20C, an item list corresponding to the category 1 may be displayed on the closed item area 920. The item list includes items a 961, b 962, c 963, d 964, e 965, f 966, g 967, h 968, i 971, j 972, k 973, 1974, m 975, n 976, o 977, and p 978. Small images of the items a 961, b 962, c 963, d 964, e 965, f 966, g 967, and h 968 may be slid and output on a second layer of the closed item area 920, and small images of the items i 971, j 972, k 973, 1974, m 975, n 976, o 977, and p 978 may be slid and output on a first layer of the closed item area 920. In this case, a speed at which the items i 971, j 972, k 973, 1974, m 975, n 976, o 977, and p 978 are slid on the first layer may be the same as a speed at which the items a 961, b 962, c 963, d 964, e 965, f 966, g 967, and h 968 are slid on the second layer.

Figure 20D:
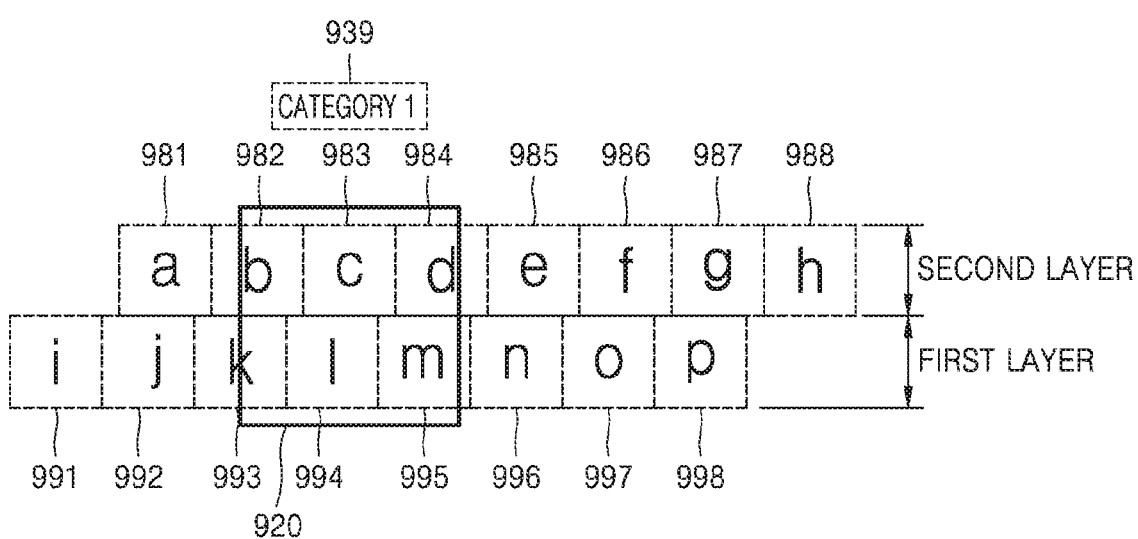

FIG. 20D illustrates an example where items are slid and output at different speeds on a first layer and a second layer of a closed item area.

Referring to FIG. 20D, an item list corresponding to the category 1 may be displayed on the closed item area 920. The item list includes items a 981, b 982, c 983, d 984, e 985, f 986, g 987, h 988, i 991, j 992, k 993, 1994, m 995, n 996, o 997, and p 998. Small images of the items a 981, b 982, c 983, d 984, e 985, f 986, g 987, and h 988 may be slid and output on a second layer of the closed item area 920, and small images of the items i 991, j 992, k 993, 1994, m 995, n 996, o 997, and p 998 may be slid and output on a first layer of the closed item area 920. In this case, a speed at which the items i 991, j 992, k 993, 1994, m 995, n 996, o 997, and p 998 are slid on the first layer may be different from a speed at which the items a 981, b 982, c 983, d 984, e 985, f 986, g 987, and h 988 are slid on the second layer.

Figure 20E:
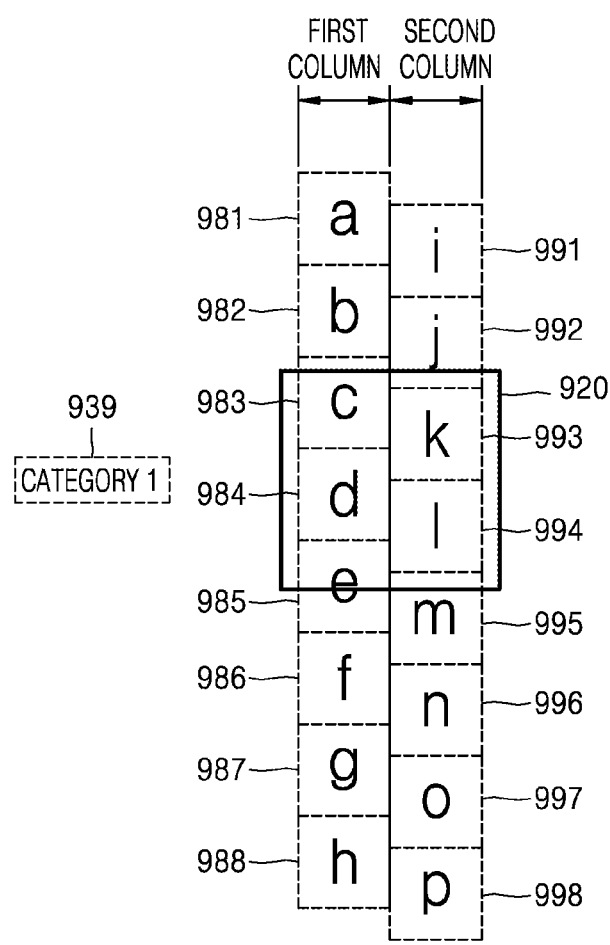

FIG. 20E illustrates an example where a closed item area is divided into a first column and a second column and items are slid at different speeds on the first column and the second column.

Referring to FIG. 20E, an item list corresponding to the category 1 939 may be displayed on the closed item area 920. The item list includes the items a 981, b 982, c 983, d 984, e 985, f 986, g 987, h 988, i 991, j 992, k 993, 1994, m 995, n 996, o 997, and p 998. Small images of the items a 981, b 982, c 983, d 984, e 985, f 986, g 987, and h 988 may be slid and output on a first column of the closed item area 920, and small images of the items i 991, j 992, k 993, 1994, m 995, n 996, o 997, and p 998 may be slid and output on a second column of the closed item area 920. In this case, a speed at which the items a 981, b 982, c 983, d 984, e 985, f 986, g 987, and h 988 are slid on the first column may be different from a speed at which the items i 991, j 992, k 993, 1994, m 995, n 996, o 997, and p 998 are slid on the second column.

Also, according to an exemplary embodiment, a speed at which items are slid and moved on a closed item area may not be linear, and may have a specific curved shape.

Figure 21A:
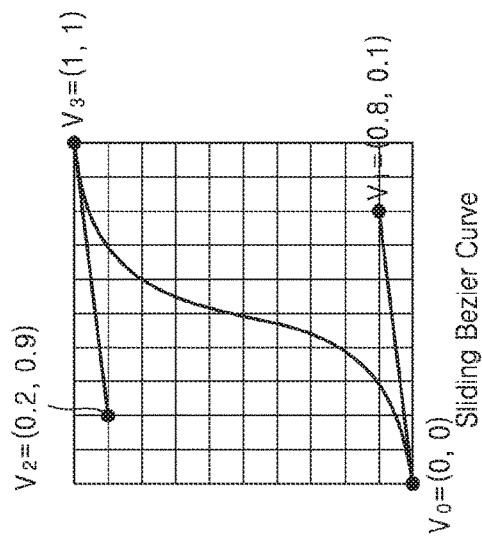
FIGS. 21A and 21B show a curve that may be used for a speed at which items are scrolled through on a closed item area according to an exemplary embodiment.

FIG. 21A shows a curve that may be used for a speed at which items are slid on a closed item area according to an exemplary embodiment.

The curve of FIG. 21A is a Bézier curve. The curve starts at a start point $V_0$ (0, 0) and arrives at an end point $V_3$ (1, 1). A slope of the curve that is obtained by a control point $V_1$ (0.8, 0.1) and a control point $V_2$ (0.2, 0.9) may be used as a speed at which items are slid on a closed item area. Referring to FIG. 21A, the horizontal axis represents an interval in which sliding occurs. The slope of the curve is small in a front part of the interval, is increased in a middle part of the interval, and is reduced again in a rear part of the interval.

Figure 21B:
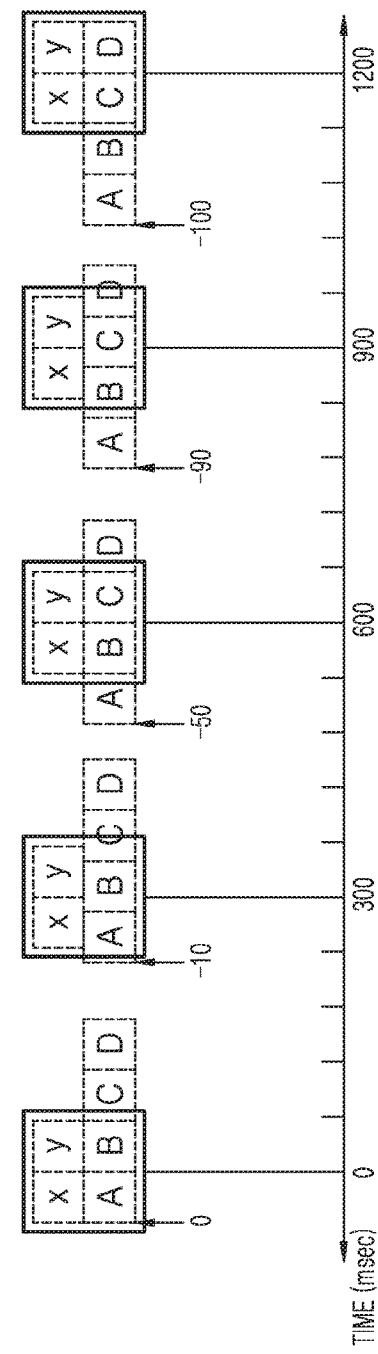

As such, when the slope of the curve that is a Bézier curve is used as a sliding speed, items are moved slowly at an early stage of the sliding, are moved quickly at a middle stage, and are moved slowly again at a late stage. Referring to FIG. 21B, when a position of a left edge of an item A that slides on a closed item area at a start point of 0 msec of sliding is 0, the position of the left edge of the item A that slides on the closed item area at a next point of 300 msec is −10. The position of the left edge of the item A that slides on the closed item area at a point of 600 msec is −50. The position of the left edge of the item A that slides on the closed item area at a point of 900 msec is −90. The position of the left edge of the item A that slides on the closed item area at a point of 1200 msec is −100. That is, since items are moved slowly at an early stage and a late stage of sliding and are moved quickly at a middle stage, the user may pleasantly feel as if the sliding occurs due to a force.

According to an exemplary embodiment, the display apparatus 100 may provide a user interface (UI) for setting categories corresponding to a plurality of item areas.

Figure 22A:
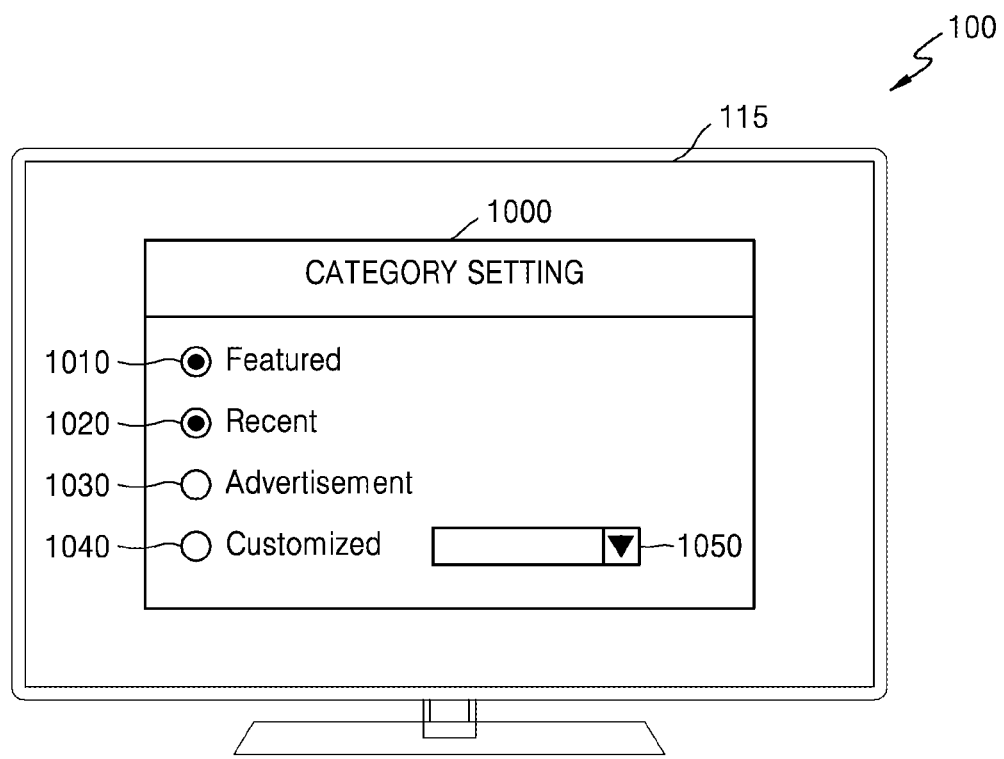
FIGS. 22A and 22B are diagrams of a user interface (UI) for receiving a category setting from a user according to an exemplary embodiment.
Figure 22B:
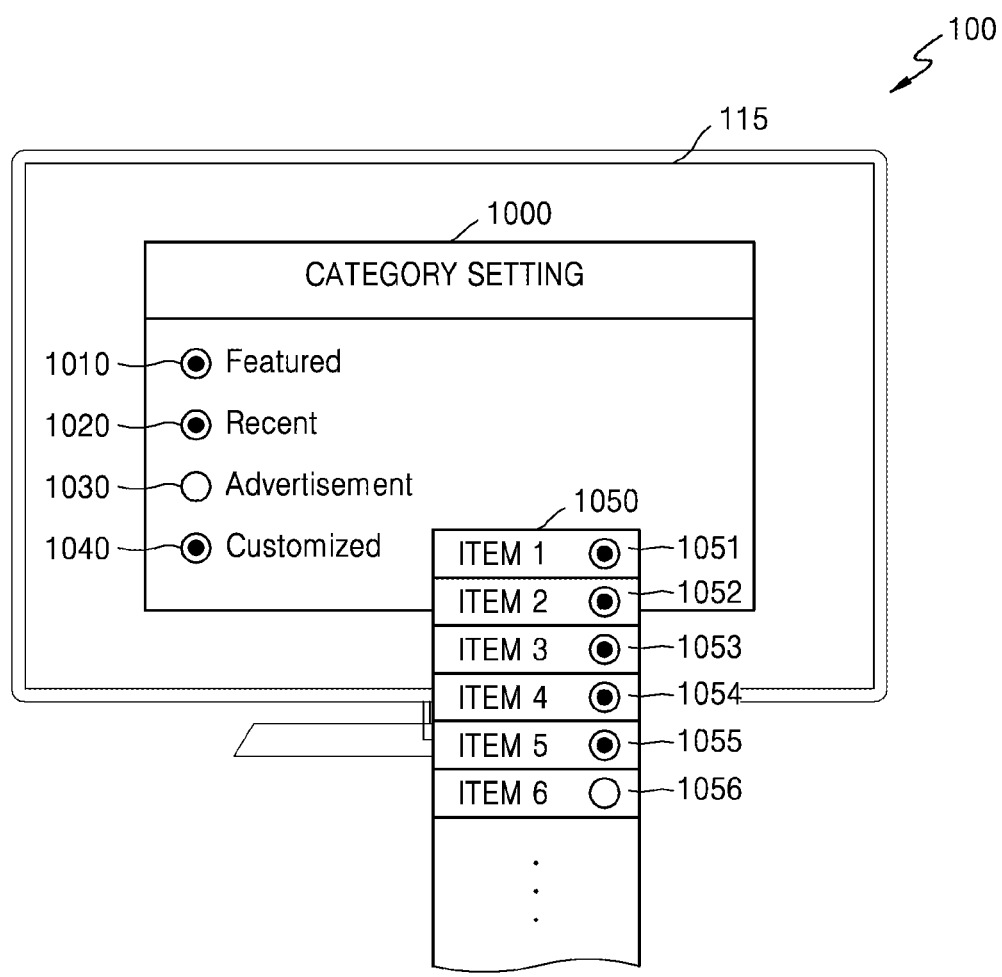

FIGS. 22A and 22B are diagrams of a UI 1000 for receiving category setting from the user according to an exemplary embodiment.

Referring to FIG. 22A, the display apparatus 100 provides the UI 1000 for setting categories to the display 115. The UI 1000 for setting categories may display, for example, Featured 1010 including items that are suggested by a service provider, Recent 1020 including items that are recently activated by the user, Advertisement 1030 including an advertisement item, and Customized 1040 by using which the user may directly select items, as categories that the user may select. When the user selects the category Customized 1040, for example, an item list 1050 whose items may be selected by the user may be opened as shown in FIG. 22B. The item list 1050 includes an item 1 1051, an item 2 1052, an item 3 1053, an item 4 1054, an item 5 1055, and an item 6 1056. The user may select the item 1 1051, the item 2 1052, the item 3 1053, the item 4 1054, and the item 5 1055 that are desired by the user, and may enable an item list including the item 1 1051, the item 2 1052, the item 3 1053, the item 4 1054, and the item 5 1055 to be displayed on an item area.

According to the one or more exemplary embodiments, since a display apparatus effectively displays and provides items, a user may pleasantly enjoy the items.

A display method according to the one or more exemplary embodiments may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

While the inventive concept has been particularly shown and described with reference to exemplary embodiments thereof by using specific terms, the embodiments and terms have merely been used to explain the inventive concept and should not be construed as limiting the scope of the inventive concept as defined by the claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. An electronic apparatus comprising:
a user input interface configured to receive a user input; and
a processor configured to:
process a first item area and a second item area to be displayed, the first item area including at least one of a plurality of first items corresponding to a first category and the second item area including a plurality of second items corresponding to a second category which is different from the first category,
based on a user input being received for scrolling the plurality of second items, process the plurality of second items to be scrolled in the second item area,
based on a user input being received for selecting the first item area:
process the plurality of first items to be moved from the first item area and into the second item area, wherein the plurality of first items displayed in the second item area are scrollable, and based on an input to select a respective first item displayed in the second item area, the respective first item of the plurality of first items displayed in the second item area is activated, and process at least one of the plurality of second items to be moved from the second item area and into the first item area, wherein the plurality of second items displayed in the first item area are not scrollable, and based on an input to select a respective second item displayed in the first item area, the respective second item of the plurality of second items displayed in the first item area is not changed to an activated state.

2. The electronic apparatus of claim 1, wherein the processor is further configured to use at least one of the first item area and the second item area as an area for displaying an item for a specific purpose.

3. The electronic apparatus of claim 1, wherein the processor is further configured to display an advertisement item at a first position in the second item area.

4. An electronic apparatus comprising:
a user input interface configured to receive a user input; and
a processor configured to:
process a first item area and a second item area to be displayed, the first item area including at least one of a plurality of first items corresponding to a first category and the second item area including at least one of a plurality of second items corresponding to a second category which is different from the first category,
based on a user input being received for scrolling the plurality of second items, process the at least one of the plurality of second items to be scrolled in the second item area,
based on a user input being received for selecting the first item area, process the at least one of the plurality of first items to be located in the second item area and to be scrollable, and
process the at least one of the plurality of second items to be located in the first item area,
wherein the processor is further configured to display an advertisement item at a first position in the second item area, and
wherein when the advertisement item is entirely displayed in the second item area, in response to the user input for selecting the first item area, the processor is further configured to control the display to maintain a size of the advertisement item but continuously change sizes of second items displayed in the second item area other than the advertisement item.

5. A method for operating an electronic apparatus comprising:
processing a first item area and a second item area to be displayed on a display of the electronic apparatus, the first item area including at least one of a plurality of first items corresponding to a first category and the second item area including a plurality of second items corresponding to a second category which is different from the first category,
based on a user input being received for scrolling the plurality of second items, processing the plurality of second items to be scrolled in the second item area,
based on a user input being received for selecting the first item area:
processing the plurality of first items to be located in the second item area, wherein the plurality of first items displayed in the second item area are scrollable, and based on an input to select a respective first item displayed in the second item area, the respective first item of the plurality of first items displayed in the second item area is activated, and
processing at least one of the plurality of second items to be located in the first item area, wherein the plurality of second items displayed in the first item area are not scrollable, and based on an input to select a respective second item displayed in the first item area, the respective second item of the plurality of second items displayed in the first item area is not changed to an activated state.

6. The method of claim 5, further comprising:
using at least one of the first item area and the second item area as an area for displaying an item for a specific purpose.

7. The method of claim 5, further comprising:
processing an advertisement item to be located at a first position in the second item area.

8. A method for operating an electronic apparatus comprising:
processing a first item area and a second item area to be displayed on a display of the electronic apparatus, the first item area including at least one of a plurality of first items corresponding to a first category and the second item area including at least one of a plurality of second items corresponding to a second category which is different from the first category,
based on a user input being received for scrolling the plurality of second items, processing the at least one of the plurality of second items to be scrolled in the second item area,
based on a user input being received for selecting the first item area, processing the at least one of the plurality of first items to be located in the second item area and to be scrollable,
processing the at least one of the plurality of second items to be located in the first item area,
processing an advertisement item to be located at a first position in the second item area, and
when the advertisement item is entirely displayed in the second item area, in response to the user input for selecting the first item area, processing to maintain a size of the advertisement item but continuously change sizes of second items displayed in the second item area other than the advertisement item.

9. An electronic apparatus comprising:
a user input interface configured to receive a user input; and
a processor configured to:
process a first item area and a second item area to be displayed, the first item area including at least one of a plurality of first items corresponding to a first category and the second item area including a plurality of second items corresponding to a second category which is different from the first category,
based on a user input being received for scrolling the plurality of second items, process the plurality of second items to be scrolled in the second item area,
based on a user input being received for selecting the first item area:
process the plurality of first items to be located in the second item area and to be scrollable, and
process at least one of the plurality of second items to be located in the first item area,
wherein the plurality of first items includes a first item located at a first position of the first item area and a second item, wherein a fixed item is located at a first position of the second item area, wherein the plurality of second items includes a third item located at a second position of the second item area and a fourth item located at a third position of the second item area, and wherein based on the user input being received for selecting the first item area, the processor is further configured to:

process the fixed item to remain in the first position of the second item area;

process the first item to be located at the second position of the second item area;

process the second item to be located at the third position of the second item area;

process the third item to be located at the first position of the first item area.

10. The electronic apparatus of claim 1, wherein based on the user input being received for selecting the first item area, the processor is further configured to:

process the plurality of first items to be continuously moved along a plurality of first paths from the first item area into the second item area, and process the at least one of the plurality of second items to be continuously moved along at least one second path from the second item area into the first item area.

* * * * *